(12) United States Patent
Hasan et al.

(10) Patent No.: US 12,198,231 B2
(45) Date of Patent: *Jan. 14, 2025

(54) GENERATING DIFFERENTIABLE PROCEDURAL MATERIALS

(71) Applicant: Adobe Inc., San Jose, CA (US)

(72) Inventors: Milos Hasan, Oakland, CA (US); Liang Shi, Cambridge, MA (US); Tamy Boubekeur, Paris (FR); Kalyan Sunkavalli, San Jose, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,618

(22) Filed: Jun. 26, 2023

(65) Prior Publication Data

US 2023/0360285 A1    Nov. 9, 2023

Related U.S. Application Data

(63) Continuation of application No. 17/513,747, filed on Oct. 28, 2021, now Pat. No. 11,688,109, which is a
(Continued)

(51) Int. Cl.
*G06T 11/00* (2006.01)
*G06N 3/08* (2023.01)
(Continued)

(52) U.S. Cl.
CPC ............ *G06T 11/001* (2013.01); *G06N 3/084* (2013.01); *G06T 11/40* (2013.01); *G06T 15/04* (2013.01)

(58) Field of Classification Search
CPC ......... G06T 11/40; G06T 15/04; G06T 11/00; G06N 3/084; G06N 3/045; G06N 3/02;
(Continued)

(56) References Cited

U.S. PATENT DOCUMENTS 8,249,365 B1    8/2012  Winnemoeller et al.
8,532,387 B2 *  9/2013  Winnemoeller ........ G06T 11/40
                                                382/181
(Continued)

OTHER PUBLICATIONS

Liang Shi et al., "MATch: Differentiable Material Graphs for Procedural Material Capture", Dec. 2020, ACM Transactions on Graphics 39(6) (Proc. SIGGRAPH Asia 2020), vol. 39, Issue 6, pp. 1-15. (Year: 2020).*

(Continued)

*Primary Examiner* — Wesner Sajous
(74) *Attorney, Agent, or Firm* — Keller Preece PLLC

(57) ABSTRACT

The present disclosure relates to using end-to-end differentiable pipeline for optimizing parameters of a base procedural material to generate a procedural material corresponding to a target physical material. For example, the disclosed systems can receive a digital image of a target physical material. In response, the disclosed systems can retrieve a differentiable procedural material for use as a base procedural material in response. The disclosed systems can compare a digital image of the base procedural material with the digital image of the target physical material using a loss function, such as a style loss function that compares visual appearance. Based on the determined loss, the disclosed systems can modify the parameters of the base procedural material to determine procedural material parameters for the target physical material. The disclosed systems can generate a procedural material corresponding to the base procedural material using the determined procedural material parameters.

20 Claims, 9 Drawing Sheets

Related U.S. Application Data continuation of application No. 16/863,540, filed on Apr. 30, 2020, now Pat. No. 11,189,060.

(51) Int. Cl.
- *G06N 3/084* (2023.01)
- *G06T 11/40* (2006.01)
- *G06T 15/04* (2011.01)

(58) Field of Classification Search
CPC ........ G06N 3/08; G06N 5/00; G06N 7/00–04; G06N 20/00
See application file for complete search history.

(56) References Cited

U.S. PATENT DOCUMENTS

| | | | |
|---|---|---|---|
| 11,189,060 B2 * | 11/2021 | Hasan | G06T 15/04 |
| 11,688,109 B2 * | 6/2023 | Hasan | G06N 3/084 |
| | | | 345/582 |
| 2019/0385344 A1 | 12/2019 | Martin et al. | |
| 2021/0043331 A1 * | 2/2021 | Ozcan | G06V 10/764 |
| 2021/0065031 A1 * | 3/2021 | Parikh | G06Q 50/60 |
| 2021/0343051 A1 | 11/2021 | Hasan et al. | |
| 2022/0051453 A1 | 2/2022 | Hasan et al. | |

OTHER PUBLICATIONS

Adobe. 2019. Substance. https://docs.substance3d.com/sat.
Alex Krizhevsky, Ilya Sutskever, and Geoffrey E Hinton. 2012. Imagenet classification with deep convolutional neural networks. In Advances in neural information processing systems. 1097-1105.
Andrew Gardner, Chris Tchou, Tim Hawkins, and Paul Debevec. 2003. Linear Light Source Reflectometry. ACM Trans. Graph. 22, 3 (Jul. 2003), 749-758.
Ayush Tewari, Michael Zollhöfer, Hyeongwoo Kim, Pablo Garrido, Florian Bernard, Patrick Pérez, and Christian Theobalt. 2017. MoFA: Model-based Deep Convolutional Face Autoencoder for Unsupervised Monocular Reconstruction. In ICCV.
B. Galerne, A. Leclaire, and L. Moisan. 2017. Texton Noise. Computer Graphics Forum 36, 8 (2017), 205-218.
Brent Burley. 2012. Physically-based shading at Disney. In ACM SIGGRAPH 2012 Courses.
Bruce Walter, Stephen R Marschner, Hongsong Li, and Kenneth E Torrance. 2007. Microfacet models for refraction through rough surfaces. In Proceedings of the 18th Eurographics conference on Rendering Techniques. Eurographics Association, 195-206.
Bruno Galerne, Ares Lagae, Sylvain Lefebvre, and George Drettakis. 2012. Gabor Noise by Example. ACM Trans. Graph. 31, 4, Article 73 (Jul. 2012), 9 pages.
Diederik Kingma and Jimmy Ba. 2014. Adam: A Method for Stochastic Optimization. International Conference on Learning Representations (Dec. 2014).
Duan Gao, Xiao Li, Yue Dong, Pieter Peers, Kun Xu, and Xin Tong. 2019. Deep Inverse Rendering for High-resolution SVBRDF Estimation from an Arbitrary Number of Images. ACM Trans. Graph. 38, 4, Article 134 (Jul. 2019), 134:1-134:15 pages.
E. Riba, D. Mishkin, D. Ponsa, E. Rublee, and G. Bradski. 2020. Kornia: an Open Source Differentiable Computer Vision Library for PyTorch. https://arxiv.org/pdf/1910. 02190.pdf.
Eric Heitz and Fabrice Neyret. 2018. High-Performance By-Example Noise Using a Histogram-Preserving Blending Operator. Proc. ACM Comput. Graph. Interact. Tech. 1, 2, Article 31 (Aug. 2018), 25 pages.
Karen Simonyan and Andrew Zisserman. 2015. Very Deep Convolutional Networks for Large-Scale Image Recognition. In International Conference on Learning Representations.
L. A. Gatys, A. S. Ecker, and M. Bethge. 2016. Image Style Transfer Using Convolutional Neural Networks. In 2016 IEEE Conference on Computer Vision and Pattern Recognition (CVPR).2414-2423. https://doi.org/10.1109/CVPR.2016.265.
Leon A. Gatys, Alexander S. Ecker, and Matthias Bethge. 2015. A Neural Algorithm of Artistic Style. arXiv:cs.CV/1508.06576.
Marzia Riso et al., pOp: Parameter Optimization of Differentiable Vector Patterns, Nov. 4, 2022, Eurographics Digital Library, vol. 41, pp. 161-168 (Year: 2022).
Matthew M. Loper and Michael J. Black. 2014. OpenDR: An Approximate Differentiable Renderer. In Computer Vision—ECCV 2014 (Lecture Notes in Computer Science), vol. 8695. Springer International Publishing, 154-169.
Matthias Fey and Jan E. Lenssen. 2019. Fast Graph Representation Learning with PyTorch Geometric. In ICLR Workshop on Representation Learning on Graphs and Manifolds.
Merlin Nimier-David, Delio Vicini, Tizian Zeltner, and Wenzel Jakob. 2019. Mitsuba 2: A Retargetable Forward and Inverse Renderer. Transactions on Graphics (Proceedings of SIGGRAPH Asia) 38, 6 (Nov. 2019).
Miika Aittala, Tim Weyrich, and Jaakko Lehtinen. 2013. Practical SVBRDF Capture in the Frequency Domain. ACM Trans. Graph. 32, 4, Article 110 (Jul. 2013), 12 pages.
Miika Aittala, Tim Weyrich, and Jaakko Lehtinen. 2015. Two-shot SVBRDF Capture for Stationary Materials. ACM Trans. Graph. 34, 4, Article 110 (Jul. 2015), 13 pages.
Miika Aittala, Timo Aila, and Jaakko Lehtinen. 2016. Reflectance Modeling by Neural Texture Synthesis. ACM Trans. Graph. 35, 4, Article 65 (2016), 65:1-65:13 pages.
Tzu-Mao Li, Miika Aittala, Frédo Durand, and Jaakko Lehtinen. 2018a. Differentiable Monte Carlo Ray Tracing through Edge Sampling. ACM Trans. Graph. (Proc. SIGGRAPH Asia) 37, 6 (2018), 222:1-222:11.
Valentin Deschaintre, Miika Aittala, Fredo Durand, George Drettakis, and Adrien Bousseau. 2018. Single-image SVBRDF Capture with a Rendering-aware Deep Network. ACM Trans. Graph. 37, 4, Article 128 (Jul. 2018), 128:1-128:15 pages.
Yiwei Hu, Julie Dorsey, and Holly Rushmeier. 2019b. A Novel Framework for Inverse Procedural Texture Modeling. ACM Trans. Graph. 38, 6, Article 186 (Nov. 2019), 14 pages.
Yoshitaka Ushiku Hiroharu Kato and Tatsuya Harada. 2018. Neural 3D Mesh Renderer. In the IEEE Conference on Computer Vision and Pattern Recognition (CVPR).
Yu Guo, Milos Hasan, Lingqi Yan, and Shuang Zhao. 2019. A Bayesian Inference Framework for Procedural Material Parameter Estimation. arXiv:cs.GR/1912.01067.
Yuanming Hu, Hao He, Chenxi Xu, Baoyuan Wang, and Stephen Lin. 2018. Exposure: A white-box photo post-processing framework. ACM Transactions on Graphics (TOG) 37, 2 (2018), 1-17.
Yuanming Hu, Luke Anderson, Tzu-Mao Li, Qi Sun, Nathan Carr, Jonathan Ragan-Kelley, and Frédo Durand. 2019a. DiffTaichi: Differentiable Programming for Physical Simulation. arXiv preprint arXiv:1910.00935 (2019).
Zhengqin Li, Kalyan Sunkavalli, and Manmohan Chandraker. 2018b. Materials for Masses: SVBRDF Acquisition with a Single Mobile Phone Image. In Computer Vision—ECCV 2018—15th European Conference, Munich, Germany, Sep. 8-14, 2018, Proceedings, Part III (Lecture Notes in Computer Science), vol. 11207. 74-90.
U.S. Appl. No. 16/863,540, Feb. 26, 2021, Preinterview 1st Office Action.
U.S. Appl. No. 16/863,540, Apr. 19, 2021, Office Action.
U.S. Appl. No. 16/863,540, Jul. 28, 2021, Notice of Allowance.
U.S. Appl. No. 17/513,747, Oct. 11, 2022, Office Action.
U.S. Appl. No. 17/513,747, Feb. 13, 2023, Notice of Allowance.

* cited by examiner

GENERATING DIFFERENTIABLE PROCEDURAL MATERIALS

CROSS-REFERENCE TO RELATED APPLICATIONS

The present application is a continuation of U.S. application Ser. No. 17/513,747, filed on Oct. 28, 2021, which is a continuation of U.S. application Ser. No. 16/863,540, filed on Apr. 30, 2020, now issued as U.S. Pat. No. 11,189,060. Each of the aforementioned applications is hereby incorporated by reference in its entirety.

BACKGROUND

Recent years have seen significant advancement in hardware and software platforms used for generating digital imagery, such as digital three-dimensional models. For example, procedural materials have become very popular in the computer graphics industry (movies, video games, architecture, and product visualization). These materials are often represented as node graphs, where each node may denote simple image processing operations, but the collective graph can produce material maps (like albedo, normal, roughness, etc.) for highly complex, real-world spatially varying bidirectional reflectance distribution functions (BRDFs). Procedural material models have a number of advantages: they are compact in memory, resolution-independent, can be evaluated efficiently for interactive feedback during the material design process, and can be easily edited to generate material variations. Using such procedural materials typically provides an editable, memory-compact, resolution-independent alternative to storing and using a full rendering of the digital material.

Despite these advances however, procedural material suffer from several technological shortcomings that result in inflexible and inaccurate operation. In particular, expert knowledge from a human designer is typically required to generate a procedural material. Indeed, generating a procedural material utilizing conventional techniques is a process that is often time-consuming and beyond the capabilities of anyone who is not an expert. As such, conventional systems are often inflexible in that they are limited in the number of available procedural materials. Due to this, a user may be required to utilize memory bulky, fixed resolution, full rendering of a desired digital material if a procedural version is not available.

SUMMARY

One or more embodiments described herein provide benefits and/or solve one or more problems in the art with systems, methods, and non-transitory computer-readable media that generate a procedural material from an image of a target material utilizing an end-to-end differentiable pipeline that adapts procedural material parameters of an existing procedural material to reflect the target material. For example, in one or more embodiments, the system receives a digital image of a target physical material. The system can generate a procedural material that corresponds to the target physical material (e.g., generates digital materials that reflect the target material) based on a differentiable version of a procedural material node graph of a base procedural material. In particular, the system can adapt the graph parameters of the differentiable version of the procedural material node graph based on a gradient-based optimization scheme to determine parameters that reflect the target physical material. In one or more embodiments, the system adjusts the graph parameters based on a style loss function. Using the modified parameters, the system can generate the procedural material. In this manner, the system can flexibly generate procedural materials that reflect target physical materials.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
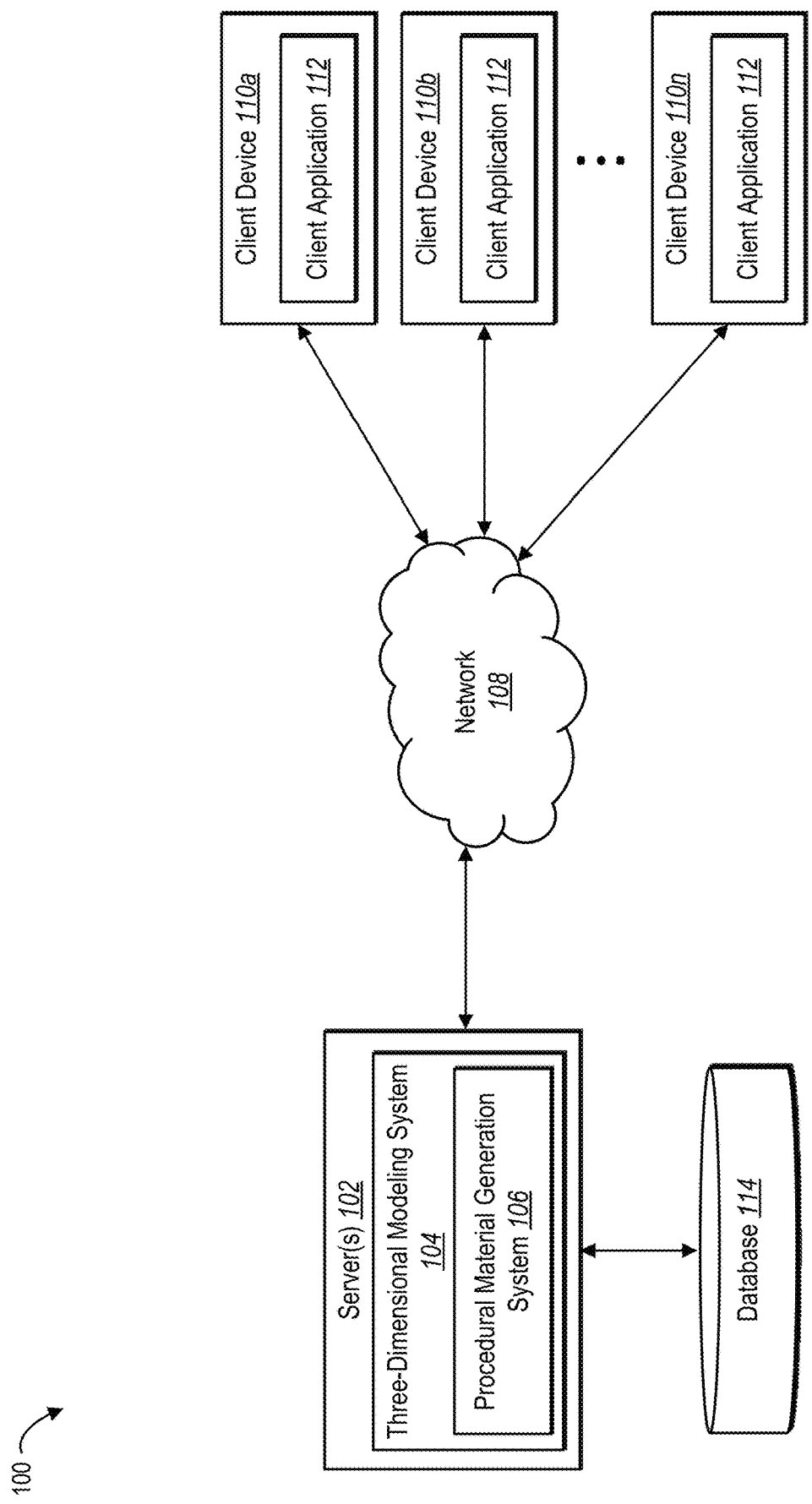
FIG. 1 illustrates an example system environment in which a procedural material generation system can operate in accordance with one or more embodiments.

One or more embodiments described herein include a procedural material generation system that utilizes an end-to-end differentiable parameter-to-image pipeline for generating procedural materials. For example, in one or more embodiments, the procedural material generation system receives a digital image of a target physical material. The procedural material generation system uses a differentiable procedural material to generate an image of a base or starting digital material. The procedural material generation system can adapt the graph parameters of the differentiable procedural material based on a comparison of the generated image with the digital image of the target physical material. For example, the procedural material generation system can utilize a gradient optimization process to modify the graph parameters of the differentiable procedural material based on the comparison (e.g., a loss determined by the comparison).

The procedural material generation system can generate a procedural material that corresponds to the target physical material based on the differentiable procedural material and the optimized parameters.

To provide an illustration, in one or more embodiments, procedural material generation system retrieves, from a database, a base procedural material with differentiable nodes in response to receiving a digital image of a target physical material. Further, the procedural material generation system determines procedural material parameters for the target physical material. In particular, the procedural material generation system generates a comparison of a digital image of the base procedural material and the digital image of the target physical material and modifies parameters of the base procedural material with differentiable nodes via back propagation based on the comparison. Using the procedural material parameters, the procedural material generation system generates a procedural material corresponding to the target physical material.

As just mentioned, in one or more embodiments, the procedural material generation system can modify the graph parameters of an existing procedural material to generate a procedural material that corresponds to a target physical material. In one or more embodiments, the procedural material generation system retrieves a base procedural material in response to receiving a digital image of a target physical material. Indeed, in some embodiments, the procedural material generation system stores a plurality of differentiable procedural materials (e.g., procedural materials with differentiable nodes) within a database. Accordingly, the procedural material generation system can retrieve the base procedural material from among the stored differentiable procedural materials.

In some embodiments, the procedural material generation system stores procedural materials (i.e., non-differentiable procedural materials) within the database. Accordingly, the procedural material generation system can retrieve the base procedural material by retrieving a procedural material and replacing the nodes of the procedural material with differentiable nodes.

Indeed, in some instances, the procedural material generation system can transform the base procedural material into a differentiable procedural material. In particular, the procedural material generation system can generate the differentiable nodes of the base procedural material. For example, the procedural material generation system can generate a plurality of differentiable atomic nodes and combine one or more of the differentiable atomic nodes to generate the differentiable nodes of the base procedural material.

As further mentioned above, in one or more embodiments, the procedural material generation system determines procedural material parameters for the target physical material. In particular, the procedural material generation system can determine parameter values for the parameters of the base procedural material that will produce a digital material corresponding to the target physical material. In other words, the procedural material generation system determines parameter values that, when implemented, enables a procedural material generated from the base procedural material to generate a digital material that reflects the target physical material.

In one or more embodiments, the procedural material generation system generates a plurality of material maps using the base procedural material (e.g., using the differentiable nodes of the base procedural material). The procedural material generation system further utilizes a rendering layer to generate a digital image of the base procedural material (e.g., a digital image of a digital material generated using the base procedural material). The procedural material generation system can determine the procedural material parameters for the target physical material based on comparing the digital image of the base procedural material and the digital image of the target physical material. In particular, the procedural material generation system can modify the graph parameters of the base procedural material based on the comparison utilizing stochastic gradient decent or another gradient-based optimization technique.

To illustrate, the procedural material generation system can extract a first set of deep neural features from the digital image of the target physical material. The procedural material generation system can further extract a second set of deep neural features from the digital image of the base procedural material. The procedural material generation system can compare the first and second sets of deep neural features and modify the parameters of the base procedural material (e.g., via back propagation) based on the comparison. In one or more embodiments, the procedural material generation system compares the first and second sets of deep neural features using a loss function, such as a style loss function.

In some instances, the procedural material generation system determines the procedural material parameters for the target physical material by iteratively modifying (i.e., updating) the parameters of the base procedural material. For example, the procedural material generation system can iteratively generate a plurality of material maps using the base procedural material (e.g., using the differentiable nodes of the base procedural material), generate a digital image of the base procedural material using a differentiable rendering layer, and compare extracted deep neural features of the digital image of the base procedural material and the digital image of the target physical material. With each iteration, the procedural material generation system can modify the parameters of the base procedural material based on the comparison of the deep neural features.

Additionally, as mentioned above, in one or more embodiments, the procedural material generation system generates a procedural material corresponding to the target physical material using the procedural material parameters. In particular, the procedural material generation system can generate a procedural material that can produce a digital material that corresponds to the target physical material. In some instances, the procedural material generation system generates the procedural material by applying the determined procedural material parameters to nodes that correspond to the differentiable nodes of the base procedural material.

In one or more embodiments, the procedural material generation system further provides the procedural material to a client device or provides access to the procedural material for application to a digital three-dimensional model. The procedural material generation system can further apply received edits to the procedural material, combine the procedural material with one or more other procedural materials, and/or modify a resolution produced by the procedural material.

The procedural material generation system provides several advantages over conventional systems. For example, the procedural material generation system can operate more flexibly than conventional systems. In particular, by utilizing a gradient-based optimization scheme (rather than a black box deep-learning based approach) to determine procedural material parameters for a target physical material, the procedural material generation system can more flexibly process more base procedural materials having a larger node count (i.e., a higher number of node parameters). Further, by evaluating differentiable procedural materials, the procedural material generation system can determine procedural material parameters beyond those related to Lambertian material maps. For example, the procedural material generation system can support roughness and metallicity maps as well in addition to albedo and normal maps. Accordingly, the procedural material generation system can flexibly generate a wider range of procedural materials than conventional systems.

Further, the procedural material generation system can improve accuracy. In particular, by utilizing a base procedural material that includes differentiable nodes, the procedural material generation system can implement gradient descent to optimize the parameters of the base procedural material. Further, by applying a loss function to the base procedural material, the procedural material generation system can directly optimize those parameters. Accordingly, the procedural material generation system can more accurately determine procedural material parameters for the target physical material.

As illustrated by the foregoing discussion, the present disclosure utilizes a variety of terms to describe features and benefits of the procedural material generation system. Additional detail is now provided regarding the meaning of these terms. For example, as used herein, the term "digital material" refers to a digitally rendered material. In particular, a digital material can refer to a digital rendering of matter that can be applied to a digital two-dimensional model or a digital three-dimensional model. For example, a digital material can be applied as a surface or exterior of a digital two-dimensional object or a digital three-dimensional object. In one or more embodiments, a digital material is defined by a bidirectional reflectance distribution function (BRDF). As used herein, the term "target physical material" refers to a digital material submitted for production of a corresponding procedural material.

In some instances, a digital material includes a digital texture. As used herein, the term "digital texture" refers to a digital material that varies in appearance over some distance. The variations in the digital material can take the form of a regular pattern or can include irregular variations. In one or more embodiments, a digital texture is defined by a spatially-varying bidirectional reflectance distribution function (SVBRDF).

Additionally, as used herein, the term "procedural material" refers to a computer algorithm or model that generates a digital material. In particular, a procedural material can refer to a set of operations (which may be referred to as procedural material operations) and a set of parameters (which may be referred to as procedural material parameters) corresponding to those operations that generate a digital material. In one or more embodiments, a procedural material includes an electronic file or other collection of data that includes the operations (including the order of those operations) and corresponding parameters that can generate a particular digital material. As used herein, the term "target procedural material" refers to a procedural material that corresponds to a target physical material. Further, as used herein, the term "digital image of a procedural material" refers to a digital image of a digital material generated using a procedural material. For example, a digital image of a base procedural material includes a rendered digital image of a digital material generated using the base procedural material.

In one or more embodiments, a procedural material can be represented as a node graph. As used herein, the term "procedural material node graph" refers to a node graph representation of a procedural material. In particular, a procedural material node graph can refer to a directed acyclic graph of nodes where the nodes correspond to operations of the represented procedural material. In one or more embodiments, the nodes within a procedural material node graph are connected to provide an order of operations used in generating the corresponding digital material. Further, the parameter(s) associated with a procedural material operation can be applied to the corresponding node within the procedural material node graph.

Additionally, as used herein, the term "atomic node" refers to an elementary node unit. In particular, an atomic node can refer to a node that is indivisible into constituent nodes but can be combined with other atomic nodes to generate other larger and/or different nodes.

Further, as used herein, the term "procedural material parameter" (or "parameter") refers to a characteristic of a procedural material. In particular, a procedural material parameter can refer to a value or other characteristic associated with a procedural material operation that enables the procedural material operation to contribute to the generation of a particular procedural material. For example, a procedural material parameter can include a configurable element (e.g., a variable) associated with an operation. Accordingly, in one or more embodiments, the procedural material generation system determines procedural material parameters by determining configurable element values that enable the operations of a procedural material to generate a particular digital material.

As used herein, the term "differentiable procedural material" refers to a differentiable embodiment of a procedural material. In particular, a differentiable procedural material can refer to a procedural material that can be differentiated. For example, a differentiable procedural material can include a procedural material having parameters that can be adjusted based on gradients associated with those parameters. Indeed, the procedural material generation system can determine the gradient (i.e., derivative) of a differentiable procedural material with respect to its input parameters. In one or more embodiments, a differentiable procedural material that is represented as a node graph (which may be referred to as a differentiable procedural material node graph) includes a plurality of differentiable nodes. As used herein, the term "differentiable node" refers to a differentiable embodiment of a procedural material operation within a node graph representation. As used herein, the term "differentiable atomic node" refers to a differentiable embodiment of an atomic node. In one or more embodiments, a differentiable node (e.g., a differentiable atomic node) is a differentiable approximation of one or more operations performed by a procedural material (e.g., one or more operations performed by a node of a non-differentiable procedural material used as reference in generating a differentiable procedural material).

Additionally, as used herein, the term "base procedural material" refers to a procedural material used to generate another procedural material. In particular, a base procedural material can refer to a procedural material having parameters that can be modified to generate another procedural material. In one or more embodiments, a base procedural material includes a differentiable procedural material.

Further, as used herein, the term "material category" refers to a category or classification associated with procedural material. In particular, a material category refers to a category of procedural materials that share one or more common characteristics. For example, a material category can include a category of procedural materials that generate similar digital materials. In one or more embodiments, a procedural material can be associated with multiple material categories.

As used herein, the term "material parameter map" refers to a component of a digital material generated from a procedural material. In particular, a material parameter map can refer to a digital material component that can be combined with other digital material components (e.g., other material parameter maps) to generate a digital material (e.g., a digital image of a digital material). In one or more embodiments, a material parameter map corresponds to a particular quality or characteristic of the resulting digital material. For example, a material parameter map can include an albedo map, a normal map, a roughness map, or a metallicity map.

As used herein, the term "differentiable rendering layer" refers to a differentiable operator that can generate a digital image of a digital material. In particular, a differentiable rendering layer can refer to a differentiable computer algorithm or model that analyzes one or more material parameter maps generated by a procedural material and generates a corresponding digital material (e.g., generates a digital image of the corresponding digital material). In some instances, the differentiable rendering layer generates the digital image of the digital material further based on a lighting input. Indeed, the differentiable rendering layer can generate a digital image of a digital material using known lighting (e.g., provided as input) that can include, but is not limited to, lighting from a camera flash. In one or more embodiments, the procedural material generation system can back propagate determined losses through the differentiable rendering layer to update parameters of a base procedural material. Indeed, in some instances, the differentiable rendering layer is differentiable. In other words, the procedural material generation system can determine the gradient (i.e., derivative) of the differentiable rendering layer with respect to its input parameters.

As used herein, the term "deep neural feature" refers to a latent feature of a digital material. In particular, a deep neural feature can refer to a latent feature of a digital material extracted from a deep neural network, such as a deep convolutional neural network. For example, a deep neural feature can include a latent feature extracted from a digital image of a base procedural material (e.g., a digital material generated using the base procedural material) or a digital material of a target physical material. In one or more embodiments, a deep neural feature corresponds to a visual appearance of a digital image (e.g., a visual appearance of a digital material presented in a digital image). But a deep neural feature can correspond to features unrelated to visual appearance as well. In some embodiments, deep neural features include a noise-agnostic embedding. In particular, the term "noise-agnostic embedding" refers to a representation of a digital image of a procedural material (e.g., a digital image of a digital material generated by the procedural material) that minimizes the effects of differing noise inputs. In particular, a noise-agnostic embedding can refer to a value or vector of values that minimizes the effect of noise on the features of a digital image of a procedural material. In one or more embodiments, the procedural material generation system determines a noise-agnostic embedding by minimizing a triplet loss. As used herein, the term "triplet loss" refers to a difference or error determined from a triplet of digital images. In some embodiments, the procedural material generation system can generate a deep neural feature that is noise-agnostic without minimizing a triplet loss.

As used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include, but is not limited to, a convolutional neural network (CNN), a residual learning neural network, a recurrent neural network (RNN), a generative adversarial neural network (GAN), a graph neural network (e.g., a graph convolutional neural network), a Region-CNN (R-CNN), a Faster R-CNN, a Mask R-CNN, single-shot detect (SSD) networks, etc.

Additionally, as used herein, the term "feature extraction neural network" refers to a computer algorithm or model that extracts deep neural features from digital images. In particular, a feature extraction neural network can refer to a computer algorithm that analyzes a digital image of a digital material and extracts deep neural features related to the digital image (e.g., related to a digital material presented in a digital image). For example, a feature extraction neural network can include a deep convolutional neural network.

As used herein, the term "style loss function" refers to a loss function that measures the difference or error between two digital images. In particular, a style loss function can refer to a loss function that measures a difference or error in the visual appearance of two digital images. In one or more embodiments, a style loss function allows for a style-based comparison that does not require or measure a pixel per pixel alignment between images. For example, a style loss function can include a loss function applied to deep neural features extracted from digital images.

Additional detail regarding the procedural material generation system will now be provided with reference to the figures. For example, FIG. 1 illustrates a schematic diagram of an exemplary system 100 in which a procedural material generation system 106 can be implemented. As illustrated in FIG. 1, the system 100 includes a server(s) 102, a network 108, client devices 110a-110n, and a database 114.

Although the system 100 of FIG. 1 is depicted as having a particular number of components, the system 100 can have any number of additional or alternative components (e.g., any number of servers, client devices, databases or other components in communication with the procedural material generation system 106 via the network 108). Similarly, although FIG. 1 illustrates a particular arrangement of the server(s) 102, the network 108, the client devices 110a-110n, and the database 114, various additional arrangements are possible.

The server(s) 102, the network 108, the client devices 110a-110n, and the database 114 may be communicatively coupled with each other either directly or indirectly (e.g., through the network 108 discussed in greater detail below in relation to FIG. 9). Moreover, the server(s) 102, and the client devices 110a-110n may include a variety of computing devices (including one or more computing devices as discussed in greater detail with relation to FIG. 9).

As mentioned above, the system 100 includes the server(s) 102. The system 100 can generate, store, receive, and/or transmit data including procedural materials. For example, the server(s) 102 can receive, from a client device (e.g., one of the client devices 110a-110n), a digital image of a target physical material. The server(s) 102 can transmit, back to the client device, a procedural material corresponds to the target physical material. In one or more embodiments, the server(s) 102 comprises a data server. The server(s) 102 can also comprise a communication server or a web-hosting server.

As shown in FIG. 1, the server(s) 102 include a three-dimensional modeling system 104. In particular, the three-dimensional modeling system 104 can generate and edit digital three-dimensional models. For example, the three-dimensional modeling system 104 can generate a digital three-dimensional model (e.g., in response to user input for designing the three-dimensional model). The three-dimensional modeling system 104 can further modify the three-dimensional model by applying a digital material. To illustrate, the three-dimensional modeling system 104 can apply a procedural material to at least a portion of the three-dimensional model.

Additionally, the server(s) 102 include the procedural material generation system 106. In particular, in one or more embodiments, the procedural material generation system 106 utilizes the server(s) 102 to generate a procedural material. For example, the procedural material generation system 106 can utilize the server(s) 102 to receive a digital image of a target physical material and generate a corresponding procedural material.

For example, in one or more embodiments, the procedural material generation system 106, via the server(s) 102, retrieves a differentiable procedural material from a database (e.g., the database 114) in response to receiving a digital image of a target physical material. The procedural material generation system 106 can, via the server(s) 102 determine procedural material parameters for the differentiable procedural material that correspond to the target physical material. In particular, via the server(s) 102, the procedural material generation system 106 can generate a rendered digital material image using the differentiable procedural material and modifying parameters of the differentiable procedural material via back propagation based on a comparison of the rendered digital material image with the digital image of the target physical material. Via the server(s) 102, the procedural material generation system 106 generate a procedural material corresponding to the target physical material using the procedural material parameters determined for the differentiable procedural material.

In one or more embodiments, the database 114 stores differentiable procedural materials. For example, the database 114 can store a plurality of differentiable nodes for a differentiable procedural material. In some embodiments, the database 114 can further store procedural material parameters for the differentiable nodes. Though FIG. 1 illustrates the database 114 as a distinct component, one or more embodiments include the database 114 as a component of the server(s) 102, the three-dimensional modeling system 104, or the procedural material generation system 106.

In one or more embodiments, the client devices 110a-110n include computing devices that can submit digital images of target physical materials and/or access and edit three-dimensional models. For example, the client devices 110a-110n can include smartphones, tablets, desktop computers, laptop computers, head-mounted-display devices, or other electronic devices. The client devices 110a-110n can include one or more applications (e.g., the client application 112) that can submit digital images of target physical materials and/or access and edit three-dimensional models. Additionally, or alternatively, the client application 112 can include a software application hosted on the server(s) 102, which may be accessed by the client devices 110a-110n through another application, such as a web browser.

The procedural material generation system 106 can be implemented in whole, or in part, by the individual elements of the system 100. Indeed, although FIG. 1 illustrates the procedural material generation system 106 implemented with regard to the server(s) 102, different components of the procedural material generation system 106 can be implemented in a variety of components of the system 100. For example, one or more components of the procedural material generation system 106—including all components of the procedural material generation system 106—can be implemented by a computing device (e.g., one of the client devices 110a-110n) or a separate server from the server(s) 102 hosting the three-dimensional modeling system 104. Example components of the procedural material generation system 106 will be discussed in more detail below with regard to FIG. 7.

Figure 2:
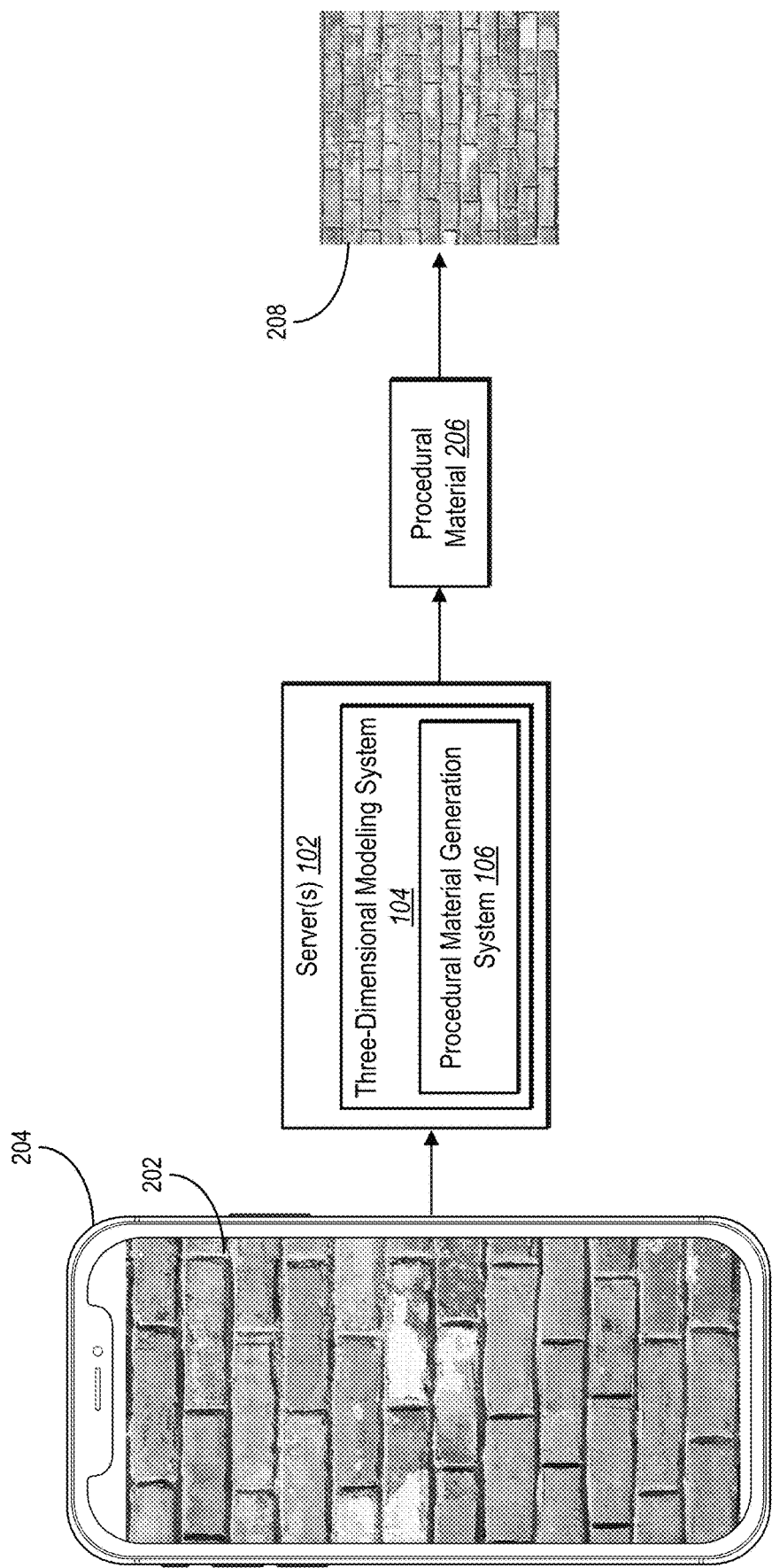
FIG. 2 illustrates an overview diagram of the procedural material generation system generating a procedural material that corresponds to a target physical material in accordance with one or more embodiments.

As mentioned above, the procedural material generation system 106 can generate a procedural material that corresponds to a target physical material. FIG. 2 illustrates an overview diagram of the procedural material generation system 106 generating a procedural material in accordance with one or more embodiments.

As shown in FIG. 2, the procedural material generation system 106 receives a target physical material 202. In particular, the procedural material generation system 106 receives the target physical material 202 from a client device 204. For example, the client device 204 can capture a digital image of the target physical material 202 (e.g., by capturing a digital image of a real-world object that embodies or otherwise portrays the target physical material). The procedural material generation system 106 can receive the digital image from the client device 204. In some instances, the client device 204 downloads the digital image of the target physical material 202 from a remote source (e.g., a server or database that stores digital materials). In one or more embodiments, receiving the digital image of the target physical material 202 includes receiving a plurality of material parameter maps that correspond to the target physical material 202.

As further shown in FIG. 2, the procedural material generation system 106 generates a procedural material 206 that corresponds to the target physical material 202. In particular, the procedural material generation system 106 can generate the procedural material 206 based on a base procedural material. Indeed, as will be discussed in more detail below, the procedural material generation system 106 can generate the procedural material 206 by determining procedural material parameters for the target physical material 202 using a base procedural material. In other words, the procedural material generation system 106 can determine procedural material parameters that, when implemented, enables a procedural material generated from the base procedural material to generate a digital material that corresponds to the target physical material 202.

Additionally, as shown in FIG. 2, the procedural material generation system 106 can utilize the procedural material 206 to generate a digital material 208. In one or more embodiments, the digital material 208 represents an instance of the target physical material 202. Indeed, the procedural material 206 may not generate a digital material that is a pixel-perfect representation of the target physical material 202. However, the digital material 208 may represent an instance of the visual appearance provided by the target physical material 202.

In one or more embodiments, the procedural material generation system 106 applies the generated digital material 208 to one or more objects. In some instances, the procedural material 206 is resolution-independent; therefore, the procedural material generation system 106 can utilize the procedural material 206 to generate a digital image having a different resolution than the resolution of the digital image of the target physical material 202. Indeed, the procedural material generation system 106 can utilize the procedural material 206 to generate a digital image having a higher resolution than the digital image of the target physical material 202.

The procedural material generation system 106 can utilize the procedural material 206 in various other ways as well. For example, in some embodiments, the procedural material generation system 106 can modify the procedural material 206 in response to receiving user input from a client device. The procedural material generation system 106 can further combine the procedural material 206 with a second procedural material to generate a third procedural material having a number of differentiable nodes that is larger than the procedural material or the second procedural material—differentiable nodes will be discussed in more detail below. The procedural material generation system 106 can further transmit the procedural material 206 to a client device via a communications network.

Figure 3:
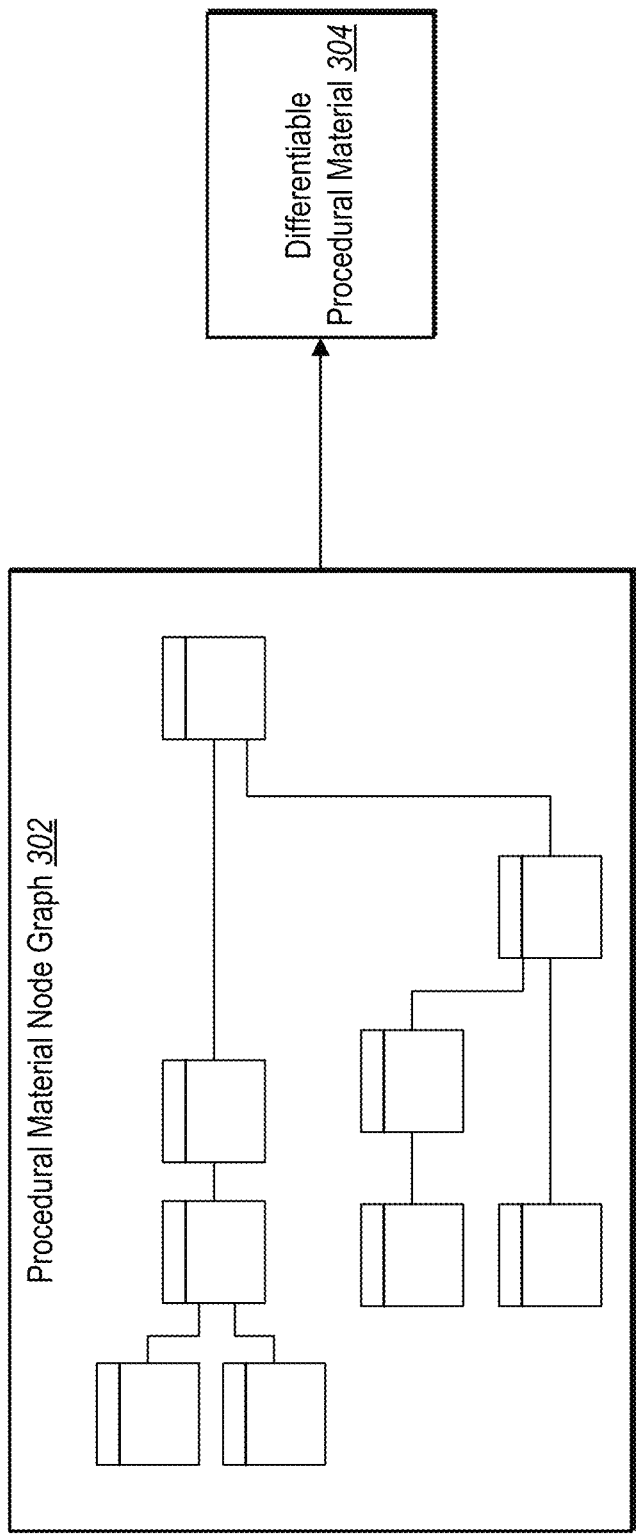
FIG. 3 illustrates a block diagram of generating a differentiable procedural material in accordance with one or more embodiments.

As mentioned above, in one or more embodiments, the procedural material generation system 106 can generate differentiable procedural materials, such as a base procedural material used to generate a procedural material corresponding to a target physical material. Indeed, in some embodiments, the procedural material generation system 106 generates a differentiable procedural material based on a procedural material node graph corresponding to a procedural material (i.e., a non-differentiable procedural material). FIG. 3 illustrates a block diagram for generating a differentiable procedural material in accordance with one or more embodiments.

As shown in FIG. 3, the procedural material generation system 106 accesses a procedural material node graph 302. For example, in one or more embodiments, the procedural material generation system 106 accesses the procedural material node graph 302 from a database storing a plurality of procedural material node graphs. In some embodiments, the procedural material generation system 106 receives the procedural material node graph 302 from a third party, such as a user via a client device. In further embodiments, the procedural material generation system 106 generates the procedural material node graph 302.

As shown in FIG. 3, the procedural material node graph 302 includes a plurality of nodes. For example, the procedural material node graph 302 can include generator nodes, filter nodes, and/or data store nodes. In one or more embodiments, the generator nodes create spatial textures based on one or more parameters (e.g., user-specified parameters). In some embodiments, generator nodes include noise generators and/or structured pattern generators. In some instances, filter nodes manipulate input textures using operations. These operations can include pixel value manipulations (e.g., color or contrast edits) or image processing operations (e.g., filtering, warping, blending, etc.). In one or more embodiments, a filter node is parameterized by the control parameters of the implemented operations (e.g., kernel size for a box filter or opacity for a blending node). In one or more embodiments, data store nodes supply captured images to the procedural material node graph 302. In some instances, a node of the procedural material node graph 302 includes an atomic node or a combination of atomic nodes.

As further shown in FIG. 3, the nodes of the procedural material node graph 302 are connected in a particular order (e.g., a particular sequence). For example, the connectivity of the nodes can define an order of operations that starts with two-dimensional scalar or vector maps (e.g., provided by generator nodes or data store nodes) and manipulates them (e.g., using operations defined by the filter nodes) to output a set of material maps.

Additionally, as shown in FIG. 3, the procedural material generation system 106 generates a differentiable procedural material 304 based on the procedural material node graph 302. In one or more embodiments, the procedural material generation system 106 generates the differentiable procedural material 304 by modifying the procedural material node graph 302 to be differentiable. In some embodiments, the procedural material generation system 106 generates the differentiable procedural material 304 by generating a new differentiable procedural material node graph based on the procedural material node graph 302. By utilizing procedural materials that are differentiable, the procedural material generation system 106 can optimize the parameters of such procedural materials via back propagation. Thus, the procedural material generation system 106 can generate target procedural materials that reflect a target physical material.

In one or more embodiments, the procedural material generation system 106 generates the differentiable procedural material 304 by replacing the nodes of the procedural material node graph 302 with differentiable nodes (e.g., whether modifying the procedural material node graph 302 or generating a new differentiable procedural material node graph). In other words, the differentiable procedural material 304 includes differentiable nodes that correspond to (e.g., are differentiable versions of) the nodes of the procedural material node graph 302. Further, the procedural material generation system 106 connects the differentiable nodes to generate an order of differentiable nodes that corresponds to the order of nodes within the procedural material node graph 302.

In one or more embodiments, the procedural material generation system 106 generates the differentiable nodes. For example, in some instances, the procedural material generation system 106 generates a plurality of differentiable atomic nodes. The procedural material generation system 106 can generate a differentiable node by combining a plurality of differentiable atomic nodes. In some embodiments, however, the procedural material generation system 106 generates a differentiable node using a single differentiable atomic node. In one or more embodiments, the differentiable atomic node or combination of differentiable atomic nodes for a differentiable node of the differentiable procedural material 304 corresponds to the atomic node or combination of atomic nodes for the corresponding node of the procedural material node graph 302. In some instances, however, when combining differentiable atomic nodes to generate a differentiable node, the procedural material generation system 106 merges inefficient calls of the individual differentiable atomic nodes. Accordingly, the procedural material generation system 106 can improve the efficiency of the resulting differentiable node.

In one or more embodiments, the procedural material generation system 106 generates the differentiable nodes by generating differentiable approximations of the operations performed by the nodes of the procedural material node graph 302. Indeed, in some embodiments, the differentiable nodes are not an exact match to the nodes of the procedural material node graph (e.g., do not produce the exact same outputs), but are rather an approximation (e.g., produce an approximation of the outputs). Accordingly, the differentiable atomic nodes and/or combinations of differentiable atomic nodes are differentiable approximations of the nodes of the procedural material node graph 302.

In one or more embodiments, rather than generating a differentiable node for the differentiable procedural material 304 that corresponds to a generator node of the procedural material node graph 302, the procedural material generation system 106 determines an output of the generator node and utilizes the output within the differentiable procedural material 304. For example, the procedural material generation system 106 can randomly sample the parameters of the generator node and use the resulting texture in the differentiable procedural material 304. In other words, the procedural material generation system 106 can use the determined output of the generator node as an input for one or more differentiable nodes of the differentiable procedural material 304. In some embodiments, the procedural material generation system 106 utilizes a differentiable affine transformation filter node within the differentiable procedural material 304 to incorporate the scale and offset parameters of the generator node from the procedural material node graph 302.

In some instances, the procedural material generation system 106 generates differentiable procedural materials using an accessible differentiable library toolset available through a software programming language. For example, in one or more embodiments, the procedural material generation system 106 utilizes PyTorch—a Torch-based machine learning library available through Python—to translate procedural material node graphs into differentiable programs. The procedural material generation system 106 can replicate the nodes within a procedural material node graph as PyTorch operations and specify their corresponding gradient computations. In one or more embodiments, the procedural material generation system 106 generates the differentiable library toolset based on another accessible differentiable library toolset available through a software programming language (e.g., PyTorch).

In one or more embodiments, the procedural material generation system 106 generates or maintains a differentiable library toolset that is tailored for the translation of procedural material node graphs into differentiable procedural materials. For example, the procedural material generation system 106 can define function routines for stateless evaluation of node operations and wrapper classes as their optimizable equivalent whose internal attributes represent node parameters that can be optimized.

In one or more embodiments, the procedural material generation system 106 considers continuous parameters (e.g., opacity of a blend node) as optimizable and discrete parameters (e.g., the number of tiles along a row defined by a tile generator node) as non-optimizable parameters. The procedural material generation system 106 can define a wrapper class to hold an optimizable parameter list and initial values for continuous parameters. The procedural material generation system 106 can call upon a wrapper class with required input images and discrete parameters to evaluate its functional counterpart. Because different continuous parameters have different ranges, the procedural material generation system 106 can define the wrapper classes to store the continuous parameters as optimizable parameters with a range of [0,1] along with non-optimizable, node-specific minimum/maximum parameters that can be used to map the parameters to their final values. Further, to prevent optimization from driving an optimizable parameter out of its domain, the procedural material generation system 106 can define wrapper classes to apply clamping internally before calling the forward function.

In one or more embodiments, the procedural material generation system 106 defines, within the generated differentiable library toolset, a base class for all optimizable graphs to inherit. The procedural material generation system 106 can define a child class derived through the base class to calls the parent's initialization function to initialize all node classes used in the current graph and then define the actual graph structure in its own forward function. The procedural material generation system 106 can define the base class to collect all derived nodes' parameters as its own parameter attributes to enable convenient graph-level optimization and provide helper functions, such as trained variable export.

Though FIG. 3 illustrates generating the differentiable procedural material 304 based on the procedural material node graph 302, in some embodiments, the procedural material generation system 106 generates the differentiable procedural material 304 from the ground up. Indeed, the procedural material generation system 106 can generate the design of the differentiable procedural material 304 without use of a reference (e.g., without referring to the procedural material node graph 302 for the nodes and node connections).

By using differentiable procedural materials, the procedural material generation system 106 incorporates functionality typically associated with machine learning models (e.g., neural networks). Indeed, the procedural material generation system 106 can combine computer graphics models with machine learning functionality to allow for more interpretable and/or more accurate result (i.e., new procedural materials that correspond to a target physical material). For example, by using differentiable procedural materials, the procedural material generation system 106 can modify the corresponding parameters via back propagation. Such modification will be discussed in more detail below with regard to FIG. 5.

Figure 4:
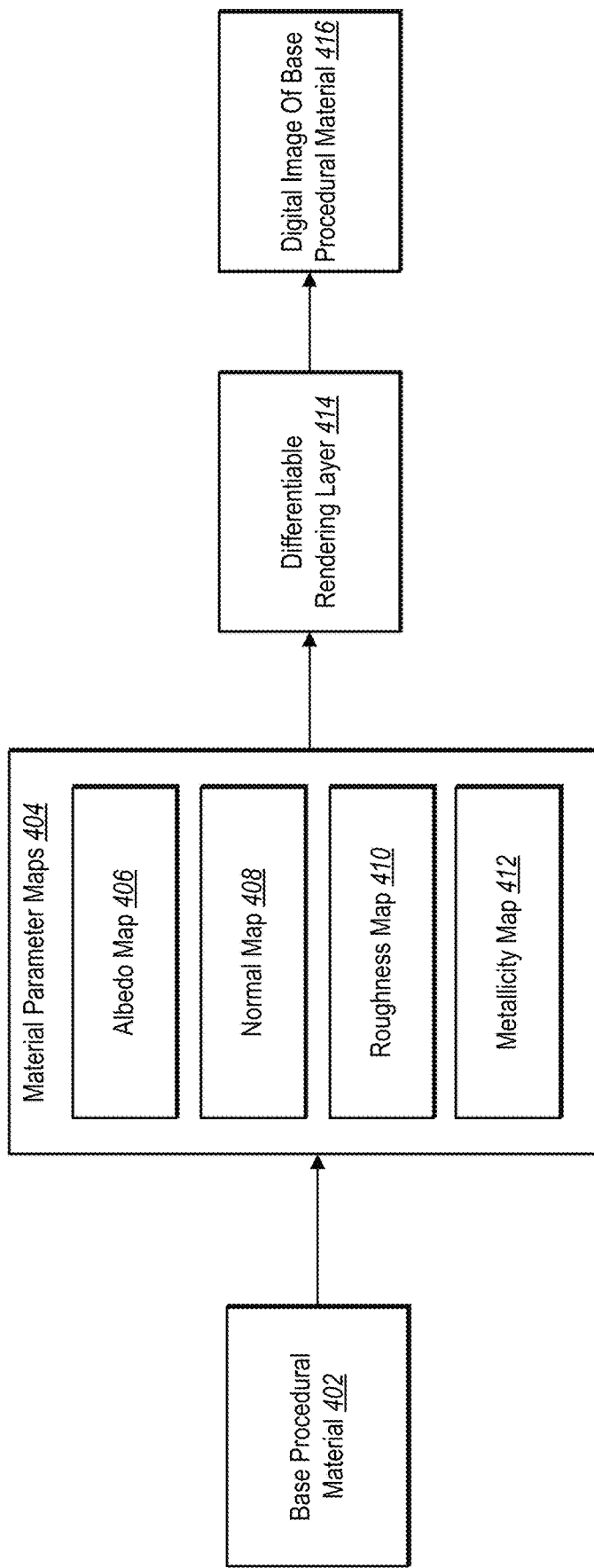
FIG. 4 illustrates a block diagram of a process of generating a digital image of a base procedural material in accordance with one or more embodiments.

As mentioned above, the procedural material generation system 106 can use a base procedural material in generating a procedural material that corresponds to a target physical material. In the process of generating the procedural material corresponding to the target physical material, the procedural material generation system 106 can generate a digital image of the base procedural material. FIG. 4 illustrates a block diagram for generating a digital image of a base procedural material in accordance with one or more embodiments.

As shown in FIG. 4, the procedural material generation system 106 retrieves a base procedural material 402. In particular, the procedural material generation system 106 can retrieve the base procedural material in response to receiving a target physical material (e.g., a digital image of the target physical material). In one or more embodiments, the procedural material generation system 106 retrieves the base procedural material 402 from a database that stores differentiable procedural materials.

In one or more embodiments, the procedural material generation system 106 retrieves the base procedural material 402 based on a material category associated with the target physical material. For example, the procedural material generation system 106 can determine a material category associated with the target physical material and select a differentiable procedural material as the base procedural material 402 from a plurality of differentiable procedural materials associated with the material category. In one or more embodiments, the procedural material generation system 106 determines the material category associated with the target physical material based on user input. For example, a user can select a material category to submit along with the digital image of the target physical material. In some embodiments, the procedural material generation system 106 applies a classifier (e.g., a pre-trained classification neural network) to the target physical material to determine the associated material category. In one or more embodiments, however, the procedural material generation system 106 can use, as the base procedural material 402, a differentiable procedural material that is not associated with the same material category as the target physical material.

As further shown in FIG. 4, the procedural material generation system 106 generates material parameter maps 404 using the base procedural material 402. For example, the procedural material generation system 106 can utilize the differentiable nodes and corresponding parameters of the base procedural material 402 to generate the material parameters maps 404. In particular, the procedural material generation system 106 can execute the operations represented by the differentiable nodes of the base procedural material 402 using the corresponding parameters.

As shown in FIG. 4, the material parameters maps 404 include a plurality of material parameter maps. For example, the material parameter maps include an albedo map 406, a normal map 408, a roughness map 410, and a metallicity map 412. Though FIG. 4 shows specific material parameters maps and a specific number of material parameter maps, the procedural material generation system 106 can generate various additional or alternative material parameters maps and/or various numbers of material parameter maps.

Additionally, as shown in FIG. 4, the procedural material generation system 106 generates a digital image of the base procedural material 402—represented by the box 416—based on the material parameters maps 404. In particular, the procedural material generation system 106 generates the digital image of the base procedural material 402 using the differentiable rendering layer 414. In one or more embodiments, the digital image of the base procedural material 402 includes a digital image of a digital material generated based on the base procedural material 402.

By utilizing a differentiable rendering layer in combination with differentiable base procedural material, the procedural material generation system 106 implements an end-to-end differentiable pipeline that facilitates the use of flexible and accurate gradient-based optimization. More detail regarding this optimization scheme will discussed below with regard to FIG. 5. Further, by evaluating differentiable procedural materials, the procedural material generation system can flexibly determine procedural material parameters beyond those related to Lambertian material maps unlike many conventional systems. Indeed, as shown in FIG. 4, the procedural material generation system 106 can determine procedural material parameters related to roughness and metallicity.

Figure 5:
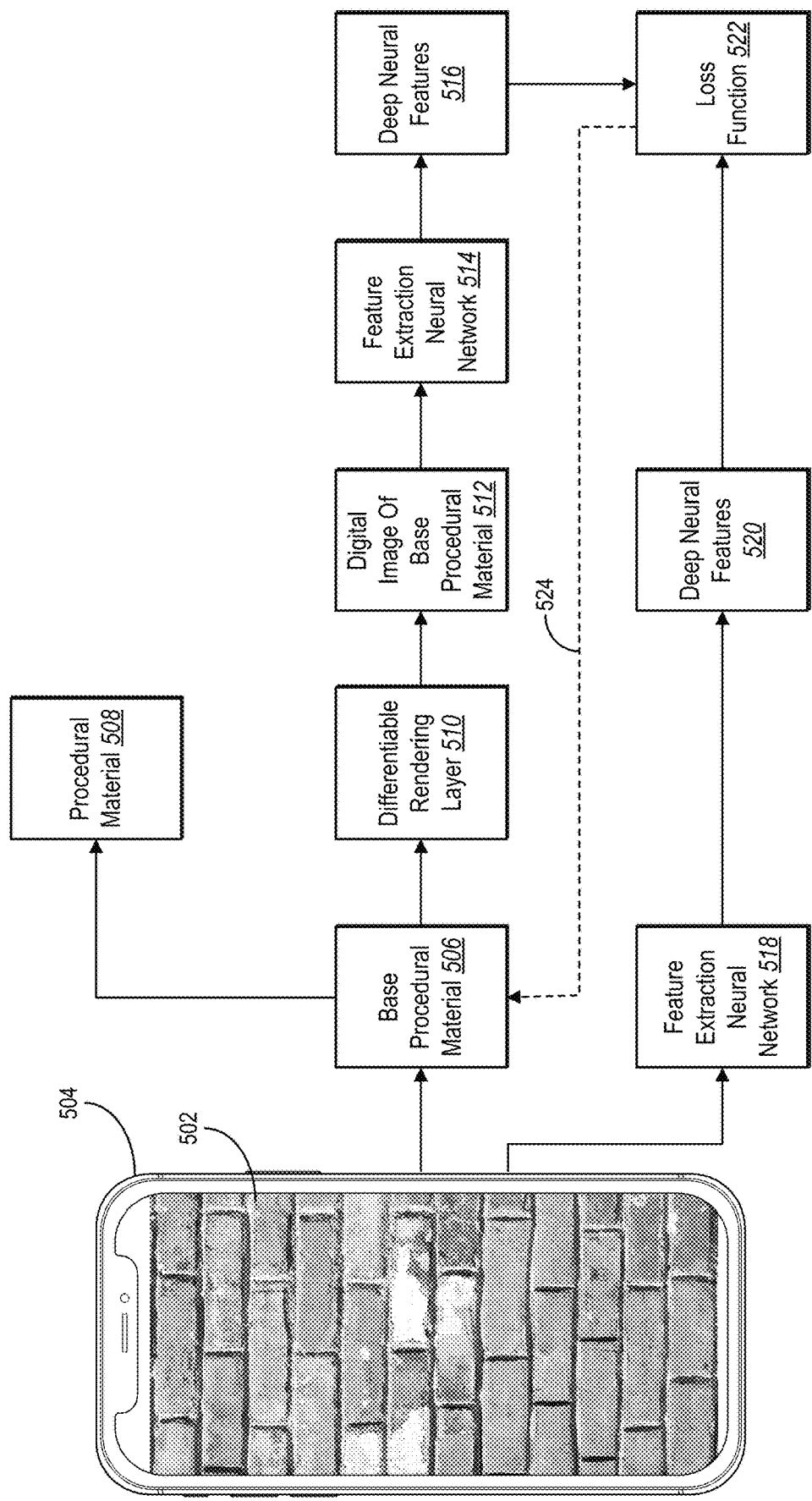
FIG. 5 illustrates a block diagram of a process of adapting parameters of a base procedural material to generate a procedural material that corresponds to a target physical material in accordance with one or more embodiments.

As mentioned above, the procedural material generation system 106 can implement a gradient-based optimization scheme for generating a procedural material that corresponds to a target physical material. In particular, the procedural material generation system 106 can optimize parameters of a base procedural material to generate the procedural material. FIG. 5 illustrates an overview of the process of optimizing parameters of a base procedural material to generate a procedural material that corresponds to a target physical material in accordance with one or more embodiments.

As shown in FIG. 5, the procedural material generation system 106 receives a target physical material 502. In particular, as discussed above, the procedural material generation system 106 receives a digital image of the target physical material 502 from a client device 504. Further, as shown in FIG. 5, the procedural material generation system 106 retrieves the base procedural material 506 in response to receiving the target physical material 502. Using the base procedural material 506 and a differentiable rendering layer 510 as discussed above with reference to FIG. 4, the procedural material generation system 106 generates a digital image of the base procedural material 506—represented by the box 512.

As further shown in FIG. 5, the procedural material generation system 106 analyzes the digital image of the base procedural material 506 using a feature extraction neural network 514. Indeed, the procedural material generation system 106 utilizes the feature extraction neural network 514 to extract deep neural features 516 from the digital image of the base procedural material 506. Similarly, the procedural material generation system 106 analyzes the target physical material 502 using a feature extraction neural network 518. Indeed, the procedural material generation system 106 utilizes the feature extraction neural network 518 to extract deep neural features 520 from the target physical material 502. For example, the procedural material generation system 106 can utilize the feature extraction neural network 518 to extract the deep neural features 520 from the received digital image of the target physical material 502. Though FIG. 5 illustrates the feature extraction neural networks 514, 518 as separate neural networks, the feature extraction neural networks 514, 518 can include the same neural network in some embodiments.

Additionally, as shown in FIG. 5, the procedural material generation system 106 compares the deep neural features 516 extracted from the digital image of the base procedural material 506 and the deep neural features 520 extracted from the target physical material 502 using a loss function 522. Indeed, the procedural material generation system 106 can utilize the loss function 522 to determine the loss (i.e., error) resulting from the base procedural material 506. In other words, the procedural material generation system 106 can utilize the loss function 522 to determine a difference between the target physical material 502 and the digital material generated using the base procedural material 506 (e.g., as represented by the digital image of the base procedural material 506). In one or more embodiments, the procedural material generation system 106 utilizes a style loss function (e.g., a perceptual loss function) as the loss function 522 in order to make an overall visual appearance comparison rather than a per-pixel comparison.

As shown in FIG. 5, the procedural material generation system 106 back propagates the determined loss to the base procedural material 506 (as indicated by the dashed line 524). Accordingly, the procedural material generation system 106 modifies the parameters of the base procedural material 506 based on the comparison made using the loss function 522. The entire pipeline shown in FIG. 5 can be differentiable. As such, the procedural material generation system 106 can back propagate the loss through the entire system but fix the parameters of the rendering layer and the feature extraction neural network(s) such that only the parameters of the differentiable base procedural material 506 are modified/updated.

In one or more embodiments, the procedural material generation system 106 iteratively repeats the process of generating a digital image of the modified base procedural material, comparing deep neural features extracted from a digital image of the modified base procedural material with deep neural features extracted from the target physical material, and modifying the parameters of the modified base procedural material via back propagation. Consequently, with each iteration, the procedural material generation system 106 gradually improves the accuracy with which the parameters correspond to the target physical material. Thus, the procedural material generation system 106 can determine procedural material parameters for the target physical material 502. The procedural material generation system 106 can generate a procedural material 508 corresponding to the target physical material 502 using the determined procedural material parameters. Thus, the procedural material generation system 106 can generate the procedural material 508 based on the base procedural material 506 by optimizing the parameters of the base procedural material 506.

More detail regarding optimizing the parameters of a base procedural material will now be provided. Generally, in one or more embodiments, given a base procedural material, represented as $\mathcal{M}$, the procedural material generation system 106 operates to estimate node parameters that will produce a spatially-varying BRDF whose rendered appearance will reproduce a target image $I^+$ (e.g., reproduce a target physical material provided in a digital image). In particular, the procedural material generation system 106 uses the material parameter vector θ of length k, a concatenation of all k optimizable parameters of the base procedural material $\mathcal{M}$. In some embodiments, the procedural material generation system 106 further uses random parameters (e.g., random noise seeds) z, though optimizing these random parameters typically results only in different instances of the same digital material, and therefore may be ignored.

The procedural material generation system 106 can define the parameter map evaluation operator M that encompass evaluation of $\mathcal{M}$. Given θ as input, the procedural material generation system 106 can use the operator M to produce material parameter maps of a simple BRDF model, combining a microfacet and diffuse term. In particular, the procedural material generation system 106 can produce an albedo map a, a normal vector map n, a roughness map r, and a metallicity map m. In one or more embodiments, the metallicity map includes a spatially-varying weight blending between a dielectric and metallic interpretation of the BRDF. The procedural material generation system 106 can represent use of the operator M as follows:

$$(a,n,r,m)=M(\theta) \quad (1)$$

The procedural material generation system 106 can further use a rendering operator, represented as R, to compute a rendered image under known illumination based on the generated material parameter maps. In one or more embodiments, the procedural material generation system 106 renders a single image mimicking a material captured by centered co-located point light (e.g., a flash highlight) and a camera. For example, the procedural material generation system 106 can render a single image simulating an image captured by a cell phone camera with a flash. However, the procedural material generation system 106 can utilize the rendering operator R to generate rendered images based on other configurations, such as multiple lighting or views. The procedural material generation system 106 can utilize the rendered image as a predicted synthetic image, generated as follows:

$$I=R(M(\theta))=R(a,n,r,m) \quad (2)$$

It should be noted that both operators M and R are differentiable, allowing for gradient computation via back propagation through the entire expression R(M(θ)).

In one or more embodiments, to optimize for θ, the procedural material generation system 106 defines a loss function between the rendered image I and the target image $I^+$. In some instances, the procedural material generation system 106 does not define the loss function to rely on a pixel-perfect alignment of texture features, because the spatial patterns between the two images, while similar, are unlikely to match exactly. Thus, to enable optimization on real inputs, the procedural material generation system 106 can use a soft loss function. For example, in one or more embodiments, the procedural material generation system 106 utilizes the style loss function for image style transfer as defined by the following:

$$L_G = \|T_G(I) - T_G(I^+)\| \quad (3)$$

In equation 3, $T_G$ represents a Gatys texture descriptor defined by the concatenation of the Gram matrices of the five feature maps before each pooling layer of the feature extraction neural network. The procedural material generation system 106 can determine the Gram matrix using the feature extraction neural network without batch normalization. In some instances, the procedural material generation system 106 utilizes, within the feature extraction neural network, average pooling rather than max pooling. In one or more embodiments, the feature extraction neural network assumes that its output is normalized to a zero mean and unit variance; accordingly, the procedural material generation system 106 applies the corresponding transformation to the images before feeding them to the feature extraction neural network. In some instances, the procedural material generation system 106 utilizes a resolution of 512×512 for both images I and $I^+$, though the procedural material generation system 106 can utilize other resolutions as well.

In one or more embodiments, the procedural material generation system 106 implements the style loss function as described in Leon A. Gatys et al., *A Neural Algorithm of Artistic Style*, arXiv:cs.CV/1508.06576, 2015, which is incorporated herein by reference in its entirety. In some embodiments, the procedural material generation system 106 implements the style loss function as described in L. A. Gatys et al., *Image Style Transfer Using Convolutional Neural Networks*, in 2016 IEEE Conference on Computer Vision and Pattern Recognition (CVPR), 2414-2423, https://doi.org/10.1109/CVPR.2016.265, which is incorporated herein by reference in its entirety.

In some embodiments, the procedural material generation system 106 utilizes the Adam optimizer with a learning rate of 5e-4 to optimize the Gram matrix loss. Because equation 2 is fully differentiable, the procedural material generation system 106 can back propagate through the rendering and the base procedural material to update the values of θ directly.

In some instances, the procedural material generation system 106 utilizes a triplet loss to determine deep neural features so that optimizing the parameters of a base procedural material is noise-agnostic. Indeed, in one or more embodiments, varying random seeds of input noise (e.g., those provided by a generator node of a procedural material node graph) creates negligible perceptual difference, but large per-pixel difference. Thus, the procedural material generation system 106 can utilize a triplet loss to determine a noise-agnostic loss so that the effects of the random seeds of input noise are minimized.

For example, the procedural material generation system 106 can generate a triplet of digital images for the base procedural material, where the triplet of digital images includes an anchor image A, a positive image P, and a negative image N. In one or more embodiments, the procedural material generation system 106 generates the anchor image and the positive image using the same parameters but different noise. Further, the procedural material generation system 106 can generate the positive image and the negative image using different parameters but the same noise. In some embodiments, the procedural material generation system 106 similarly generates a triplet of digital images for the target physical material.

Further, the procedural material generation system 106 can determine a noise-agnostic embedding for the digital image of the base procedural material based on the triplet of digital images for the base procedural material. In one or more embodiments, the procedural material generation system 106 furthers determine a noise-agnostic embedding for the digital image of the target physical material based on the triplet of digital images for the target physical material In particular, the procedural material generation system 106 can minimize a triplet loss associated with a triplet of digital images using the following where E(·) represents an embedding network:

$$\|E(I_A)-E(I_P)\|+\|E(I_A)-E(I_N)\|-\|E(I_P)-E(I_N)\|\| \qquad (4)$$

In one or more embodiments, the procedural material generation system 106 utilizes the noise-agnostic embedding corresponding to the digital image of the base procedural material as the deep neural features 516. Similarly, in some embodiments, the procedural material generation system 106 utilizes the noise-agnostic embedding corresponding to the digital image of the target physical material as the deep neural features 520.

In one or more embodiments, in implementing a triplet loss, the procedural material generation system 106 utilizes a dynamic margin to reflect the noise-agnostic similarity. Further, the procedural material generation system 106 can utilize a margin between two negative examples as well as a margin between a positive and a negative.

Though FIG. 5 illustrates use of one base procedural material in generating the procedural material 508, in one or more embodiments, the procedural material generation system 106 utilizes a plurality of base procedural materials to generate the procedural material 508. For example, in some instances, the procedural material generation system 106 utilizes a plurality of differentiable procedural materials stored within a database. In particular, the procedural material generation system 106 can iteratively modify the parameters of a plurality of differentiable procedural materials stored within a database and then generate the procedural material 508 based on the differentiable procedural material associated with the parameters providing the best match with the target physical material 502. In some embodiments, the procedural material generation system 106 utilizes a plurality of differentiable procedural materials from a material category associated with the target physical material 502.

As just mentioned, and as discussed above, the procedural material generation system 106 can utilize, as the base procedural material 506, a differentiable procedural material from a material category associated with the target physical material 502. In some embodiments, the procedural material generation system 106 utilizes a differentiable procedural material from a different material category. In some instances, however, by using a differentiable procedural material from the same material category, the procedural material generation system 106 converges to procedural material parameters for the target physical material more quickly.

By utilizing the parameter-optimization scheme discussed above, the procedural material generation system 106 can operate more flexibly than conventional systems. In particular, by utilizing a gradient-based optimization scheme determine procedural material parameters for a target physical material, the procedural material generation system 106 can more flexibly process base procedural materials having a large node count in contrast to many conventional systems using a black box deep-learning based approach. Accordingly, the procedural material generation system can flexibly generate a wider range of procedural materials than conventional systems.

Further, the procedural material generation system 106 can operate more accurately than conventional systems. Indeed, by applying the loss function to the base procedural material, the procedural material generation system can directly optimize those parameters. In particular, as mentioned above, using a differentiable procedural material as the base procedural material and a differentiable rendering layer allows for gradient computation via back propagation through the entire expression to directly optimize the parameters of the base procedural material. Accordingly, the procedural material generation system can more accurately determine procedural material parameters for the target physical material, resulting in a procedural material that can produce a digital material that more accurately represents a target physical material.

Thus, the procedural material generation system 106 can generate a procedural material corresponding to a target physical material. In particular, the procedural material generation system 106 can generate the procedural material using a differentiable procedural material as a base procedural material. The algorithm and acts described with reference to FIGS. 4-5 can comprise the corresponding structure for performing a step for generating a procedural material corresponding to a target physical material using a differentiable procedural material.

As mentioned above, the procedural material generation system 106 can generate procedural materials that more accurately provide the visual appearance of a target physical material. Researchers have conducted studies to determine the accuracy of one or more embodiments of the procedural material generation system 106 in generating procedural materials that provide the visual appearance of a target physical material.

Figure 6:
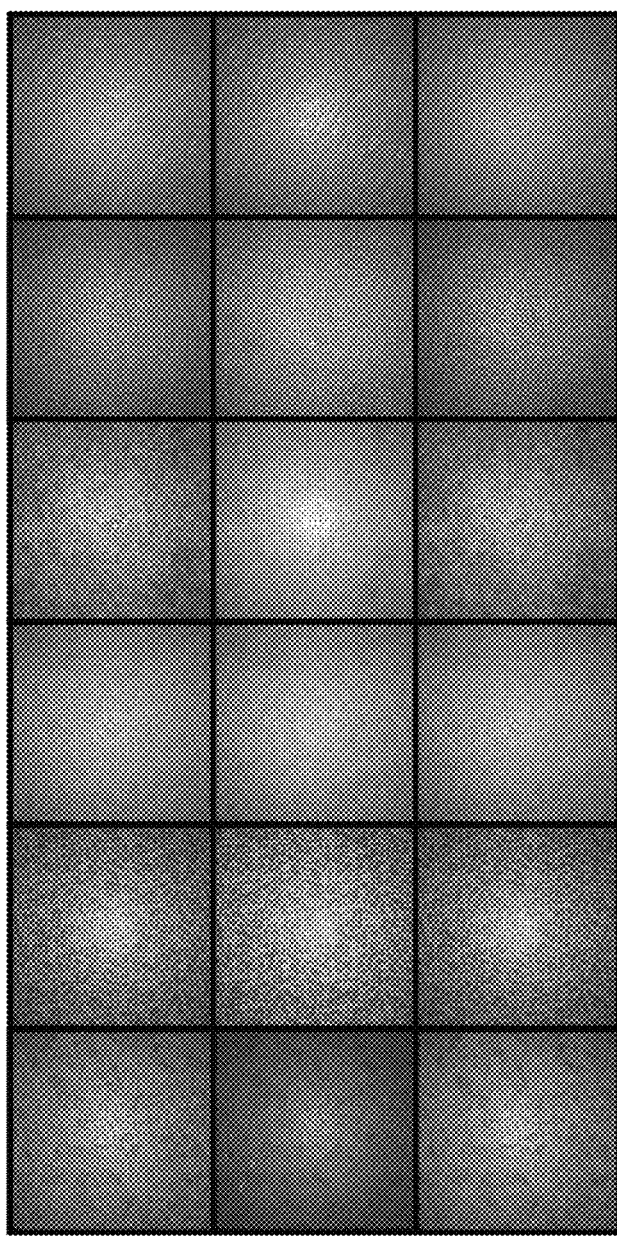
FIG. 6 illustrates a graphical representation reflecting experimental results regarding the effectiveness of the procedural material generation system in accordance with one or more embodiments.

FIG. 6 illustrates a graphical representation reflecting experimental results regarding the effectiveness of the procedural material generation system 106 in accordance with one or more embodiments. As shown in FIG. 6, the graphical representation compares the performance of one embodiment of the procedural material generation system 106 (labeled as "Optimization using proposed differentiable node graph") after optimization of the parameters of a base procedural material with a non-differentiable learning approach (labeled as "Prediction using a standard neural network") used by some conventional systems. In particular, the graphical representation shows how the results of each approach compares to several target physical materials. It should be noted that the images provided in the graphical representation of FIG. 6 represent inverted images to aid in display via black and white patent drawings.

As shown in FIG. 6, the procedural material generation system 106 generates a digital material that more accurately reflects the visual appearance of the target physical material. In many cases, the procedural material generation system 106 operates more accurately than the deep learning-based approach even before optimization. Thus, the procedural material generation system 106 can generate procedural materials that provide digital materials that more accurately reflect the visual appearance of target physical materials when compared to conventional systems.

Figure 7:
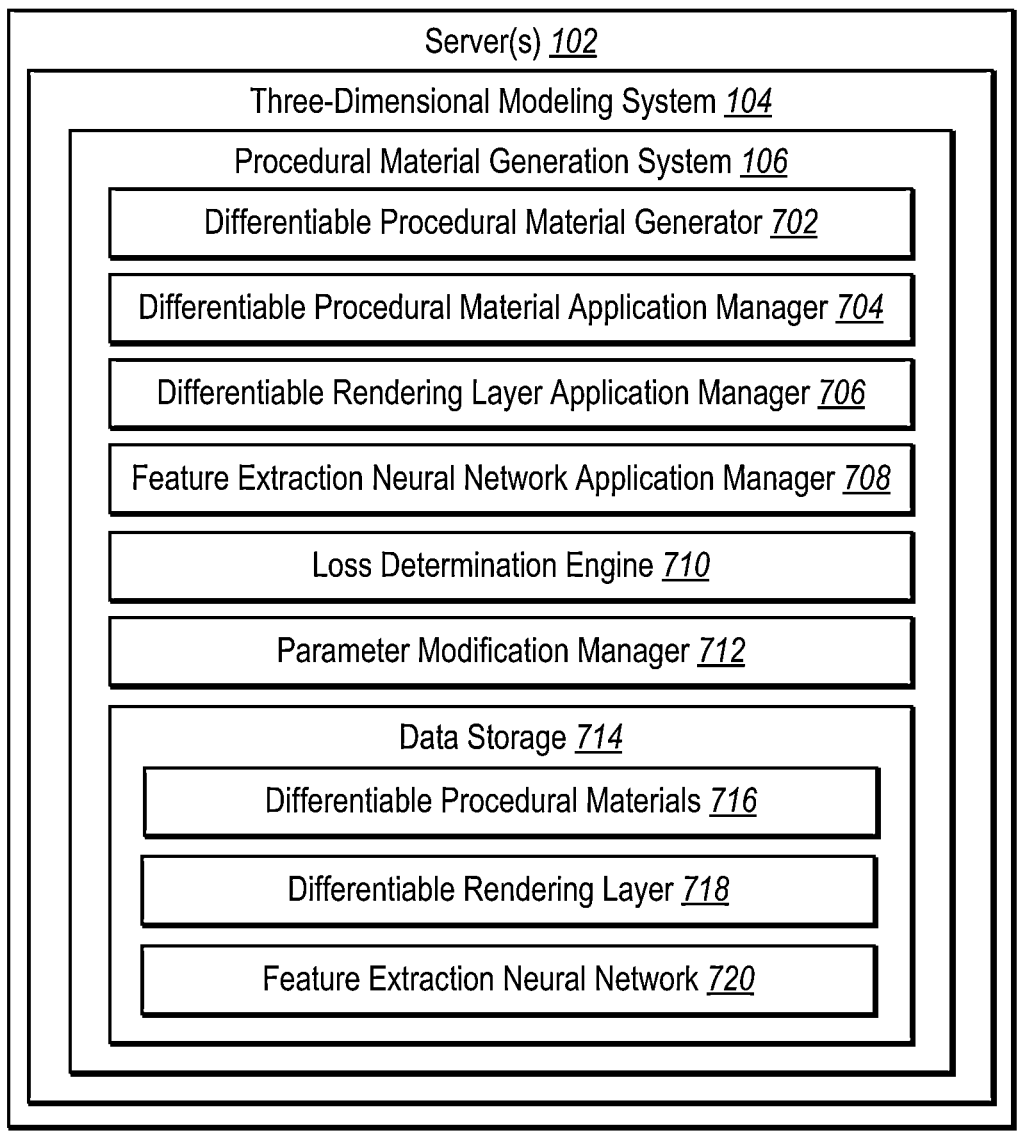
FIG. 7 illustrates a schematic diagram of a procedural material generation system in accordance with one or more embodiments.

Turning now to FIG. 7, additional detail will now be provided regarding various components and capabilities of the procedural material generation system 106. In particular, FIG. 7 illustrates the procedural material generation system 106 implemented by the server(s) 102. Additionally, the procedural material generation system 106 is also part of the three-dimensional modeling system 104. As shown, the procedural material generation system 106 can include, but is not limited to, a differentiable procedural material generator 702, a differentiable procedural material application manager 704, a differentiable rendering layer application manager 706, a feature extraction neural network application manager 708, a loss determination engine 710, a parameter modification manager 712, and data storage 714 (which includes differentiable procedural materials 716, a differentiable rendering layer 718, and a feature extraction neural network 720.

As just mentioned, and as illustrated in FIG. 7, the procedural material generation system 106 includes the differentiable procedural material generator 702. In particular, the differentiable procedural material generator 702 can generate differentiable procedural materials for use as base procedural materials in generating procedural materials that correspond to target physical materials. In one or more embodiments, the differentiable procedural material generator 702 generates differentiable procedural materials from procedural material node graphs. For example, the differentiable procedural material generator 702 can generate a differentiable procedural material by replacing the nodes of a procedural material node graph with differentiable nodes. In some instances, the differentiable procedural material generator 702 can generate the differentiable nodes by generating and combining differentiable atomic nodes. In some embodiments, the differentiable procedural material generator 702 generates differentiable procedural materials without reference to procedural material node graphs.

Additionally, as shown in FIG. 7, the procedural material generation system 106 includes the differentiable procedural material application manager 704. In particular, the differentiable procedural material application manager 704 can execute a previously-generated differentiable procedural material (e.g., a base procedural material) for generating material parameter maps. For example, the differentiable procedural material application manager 704 can execute the operations represented by the differentiable nodes of the differentiable procedural material to generate the material parameters maps. Further, the differentiable procedural material application manager 704 can apply the parameters associated with the differentiable procedural material to the operations of the differentiable nodes to generate the material parameter maps. In some instances, as the parameters are updated via the parameter modification manager 712, the differentiable procedural material application manager 704 applies the updated parameters to the differentiable nodes of the differentiable procedural material.

Further, as shown in FIG. 7, the procedural material generation system 106 includes the differentiable rendering layer application manager 706. In particular, the differentiable rendering layer application manager 706 renders a digital image of a base procedural material. For example, the differentiable rendering layer application manager 706 can apply a differentiable rendering layer to the material maps generated by the differentiable procedural material application manager 704 in order to generate a digital image of the corresponding base procedural material (e.g., to generate a digital image of a digital material generated by the base procedural material).

As shown in FIG. 7, the procedural material generation system 106 further includes the feature extraction neural network application manager 708. In particular, the feature extraction neural network application manager 708 can apply a feature extraction neural network to a digital image of a base procedural material to extract a set of deep neural features associated with the digital image of the base procedural material. Further, the feature extraction neural network application manager 708 can apply a feature extraction neural network to a digital image of a target physical material to extract a set of deep neural features associated with the digital image of the target physical material.

As shown in FIG. 7, the procedural material generation system 106 also includes the loss determination engine 710. In particular, the loss determination engine 710 can determine a loss (e.g., an error) of a base procedural material. In particular, the loss determination engine 710 can determine a difference between a digital image of a base procedural material and a digital image of a target physical material based on deep neural features associated with each digital image that have been extracted by the feature extraction neural network application manager 708. For example, the loss determination engine 710 can apply a loss function to the deep neural features associated extracted by the feature extraction neural network application manager 708 to determine the loss.

Additionally, as shown in FIG. 7, the procedural material generation system 106 includes the parameter modification manager 712. In particular, the parameter modification manager 712 can modify the parameters of a base procedural material. For example, the parameter modification manager 712 can modify the parameters of a base procedural material based on a loss determined by the loss determination engine 710. After iteratively modifying the parameters of a base procedural material, the parameter modification manager 712 can determine the procedural material parameters for a target physical material.

Further, as shown in FIG. 7, the procedural material generation system 106 includes data storage 714. In particular, data storage 714 includes differentiable procedural materials 716, differentiable rendering layer 718, and feature extraction neural network 720. Differentiable procedural materials 716 can store the differentiable procedural materials generated by the differentiable procedural material generator 702 and used by the differentiable procedural material application manager 704 as base procedural materials. Differentiable rendering layer 718 can store the differentiable rendering layer use by the differentiable rendering layer application manager 706 to generate a digital image of a base procedural material based on material parameter maps generated by the differentiable procedural material application manager 704. Feature extraction neural network 720 can store the feature extraction neural network used to extract deep neural features from digital images of base procedural materials and digital images of target physical materials for comparison by the loss determination engine 710.

Each of the components 702-720 of the procedural material generation system 106 can include software, hardware, or both. For example, the components 702-720 can include one or more instructions stored on a computer-readable storage medium and executable by processors of one or more computing devices, such as a client device or server device. When executed by the one or more processors, the computer-executable instructions of the procedural material generation system 106 can cause the computing device(s) to perform the methods described herein. Alternatively, the components 702-720 can include hardware, such as a special-purpose processing device to perform a certain function or group of functions. Alternatively, the components 702-720 of the procedural material generation system 106 can include a combination of computer-executable instructions and hardware.

Furthermore, the components 702-720 of the procedural material generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-720 of the procedural material generation system 106 may be implemented as a stand-alone application, such as a desktop or mobile application. Furthermore, the components 702-720 of the procedural material generation system 106 may be implemented as one or more web-based applications hosted on a remote server. Alternatively, or additionally, the components 702-720 of the procedural material generation system 106 may be implemented in a suite of mobile device applications or "apps." For example, in one or more embodiments, the procedural material generation system 106 can comprise or operate in connection with digital software applications such as ADOBE® SUBSTANCE DESIGNER or ADOBE® ILLUSTRATOR®. "ADOBE," "SUBSTANCE DESIGNER," and "ILLUSTRATOR" are either registered trademarks or trademarks of Adobe Inc. in the United States and/or other countries.

Figure 8:
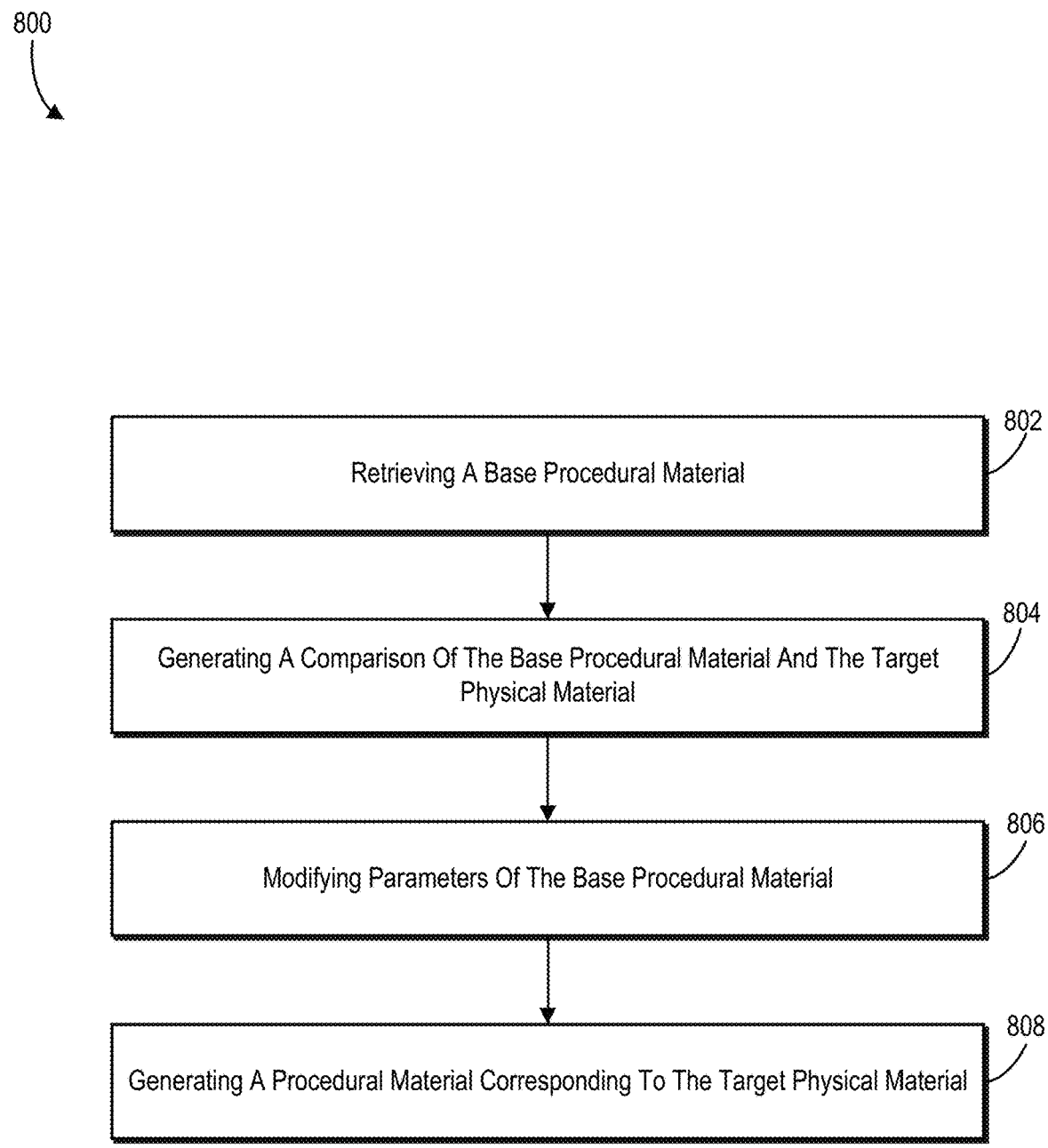
FIG. 8 illustrates a flowchart of a series of acts for generating a procedural material that corresponds to a target physical material in accordance with one or more embodiments.

FIGS. 1-7, the corresponding text and the examples provide a number of different methods, systems, devices, and non-transitory computer-readable media of the procedural material generation system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

As mentioned, FIG. 8 illustrates a flowchart of a series of acts 800 for generating a procedural material that corresponds to a target physical material in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. For example, in some embodiments, the acts of FIG. 8 can be performed, in a digital medium environment for simulating real-world images, as part of a computer-implemented method for generating procedural materials. Alternatively, a non-transitory computer-readable medium can store instructions thereon that, when executed by at least one processor, cause a computing device to perform the acts of FIG. 8. In some embodiments, a system can perform the acts of FIG. 8. For example, in one or more embodiments, a system includes at least one memory device comprising a base procedural material comprising a plurality of differentiable nodes. The system can further include at least one server device configured to cause the system to perform the acts of FIG. 8.

The series of acts 800 includes an act 802 of retrieving a base procedural material. For example, the act 802 can involve retrieving, from a database, a base procedural material with differentiable nodes in response to receiving a digital image of a target physical material. Indeed, in one or more embodiments, the procedural material generation system 106 receives a digital image of a target physical material. In some instances, the procedural material generation system 106 receives the digital image of the target physical material by receiving a plurality of material parameter maps corresponding to the target physical material.

In one or more embodiments, retrieving the base procedural material with the differentiable nodes comprises retrieving, from the database, a procedural material node graph comprising a plurality of nodes; and replacing the plurality of nodes with the differentiable nodes. In some instances, the procedural material generation system 106 generates the differentiable nodes. For example, the procedural material generation system 106 can generate the differentiable nodes by: generating a plurality of differentiable atomic nodes; and combining one or more differentiable atomic nodes from the plurality of differentiable atomic nodes to generate the differentiable nodes.

As suggested above, in one or more embodiments, the procedural material generation system 106 generates the base procedural material based on a reference procedural material node graph comprising a plurality of nodes. For example, the procedural material generation system 106 can generate the base procedural material by generating the plurality of differentiable nodes by generating differentiable approximations of operations performed by the plurality of nodes of the reference procedural material node graph; and replacing the nodes of the reference procedural material node graph with the plurality of differentiable nodes.

In some embodiments, retrieving the base procedural material includes determining a material category of the target physical material; and retrieving, from the database, a differentiable procedural material associated with the material category. As discussed above, in one or more embodiments, a base procedural material includes a differentiable procedural material. Thus, the procedural material generation system 106 can retrieve a differentiable procedural material associated with a material category corresponding to the target physical material. Indeed, the procedural material generation system 106 can determining the material category corresponding to the target physical material. Accordingly, retrieving the differentiable procedural material can include selecting the differentiable procedural material from a plurality of differentiable procedural materials associated with the material category.

The series of acts 800 also includes an act 804 of generating a comparison of the base procedural material and the target physical material. For example, the act 804 can involve determining procedural material parameters for the target physical material by generating a comparison of a digital image of the base procedural material and the digital image of the target physical material.

In some embodiments, the procedural material generation system 106 extracts a first set of deep neural features from the digital image of the target physical material; extracts a second set of deep neural features from a digital image of the base procedural material; and compares the first set of deep neural features and the second set of deep neural features using a loss function.

Indeed, in one or more embodiments, generating the comparison of the digital image of the base procedural material and the digital image of the target physical material comprises: extracting a first set of deep neural features from the digital image of the target physical material utilizing a feature extraction neural network; extracting a second set of deep neural features from the digital image of the base procedural material using the feature extraction neural network; and comparing the first set of deep neural features and the second set of deep neural features. In some instances, comparing the first set of deep neural features and the second set of deep neural features comprises using a style loss function to compare the first set of deep neural features and the second set of deep neural features.

In some instances, the procedural material generation system 106 determines a noise-agnostic embedding for the digital image of the base procedural material so that generation of the procedural material (i.e., the target procedural material) corresponds to the target physical material regardless of the noise experienced. To illustrate, in some embodiments, the procedural material generation system 106 generates the digital image of the base procedural material by generating a triplet of digital images of the base procedural material using different sets of parameters and different sets of noise for the base procedural material; and determines a noise-agnostic embedding for the digital image of the base procedural material by minimizing a triplet loss associated with the triplet of digital images of the base procedural material. Accordingly, extracting the second set of deep neural features from the digital image of the base procedural material can include extracting the second set of deep neural features based on the noise-agnostic embedding for the digital image of the base procedural material (e.g., utilizing the noise-agnostic embedding as the second set of deep neural features).

In some embodiments, the procedural material generation system 106 generates the digital image of the base procedural material. In some instances, the procedural material generation system 106 generates, based on the parameters of the base procedural material, the digital image of the base procedural material utilizing a differentiable rendering layer. For example, the procedural material generation system 106 can generate a plurality of material parameter maps using the parameters of the base procedural material; and generate the digital image of the base procedural material based on the plurality of material parameters maps using a differentiable rendering layer. In some embodiments, generating the plurality of material parameters maps includes generating an albedo map, a normal map, a roughness map, and a metallicity map.

Additionally, the series of acts 800 includes an act 806 of modifying parameters of the base procedural material. For example, the act 806 can involve determining the procedural material parameters for the target physical material by further modifying parameters of the base procedural material with the differentiable nodes via back propagation based on the comparison. In particular, the procedural material generation system 106 can modify parameters of the plurality of differentiable nodes of the base procedural material via back propagation based on comparing the first set of deep neural features and the second set of deep neural features.

In one or more embodiments, the procedural material generation system 106 iteratively determines the procedural material parameters for the target physical material by iteratively updating the parameters of the base procedural material (e.g., updating those parameters that were previously modified as described above). To illustrate, in one or more embodiments, the procedural material generation system 106 determines the procedural material parameters for the target physical material by: iteratively generating an updated digital image of the base procedural material based on modified parameters of the plurality of differentiable nodes of the base procedural material; comparing, with each iteration, the first set of deep neural features associated with the digital image of the target physical material and an updated set of deep neural features associated with the updated digital image of the base procedural material; and updating, with each iteration, the modified parameters of the plurality of differentiable nodes of the base procedural material.

The series of acts 800 further includes an act 808 of generating a procedural material corresponding to the target physical material. For example, the act 808 can involve generating a procedural material (i.e., a target procedural material) corresponding to the target physical material using the procedural material parameters.

In one or more embodiments, the procedural material generation system 106 can utilize the procedural material (i.e., the target procedural material) that corresponds to the target physical material to generate digital images of one or more objects having the target physical material applied thereon. In some embodiments, the procedural material generation system 106 can generate these digital images using various resolutions—even resolutions that are greater than the resolution of the digital image of the target physical material. In other words, the procedural material (i.e., the target procedural material) corresponding to the target physical material can be resolution-independent. To illustrate, the digital image of the target physical material can include a first resolution. The procedural material generation system 106 can utilize the procedural material (i.e., the target procedural material to generate a second digital image of an object having the target physical material applied thereto, wherein the second digital image has a second resolution that is higher than the first resolution.

In one or more embodiments, the series of acts 800 further includes acts for utilizing the procedural material corresponding to the target physical material. For example, in some embodiments, the acts include combining the procedural material with a second procedural material to generate a third procedural material having a number of differentiable nodes that is larger than the procedural material or the second procedural material. In some instances, the acts include modifying the procedural material corresponding to the target physical material in response to receiving user input from a client device. The acts can also include transmitting the procedural material (i.e., the target procedural material) corresponding to the target physical material to a client device via a communications network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
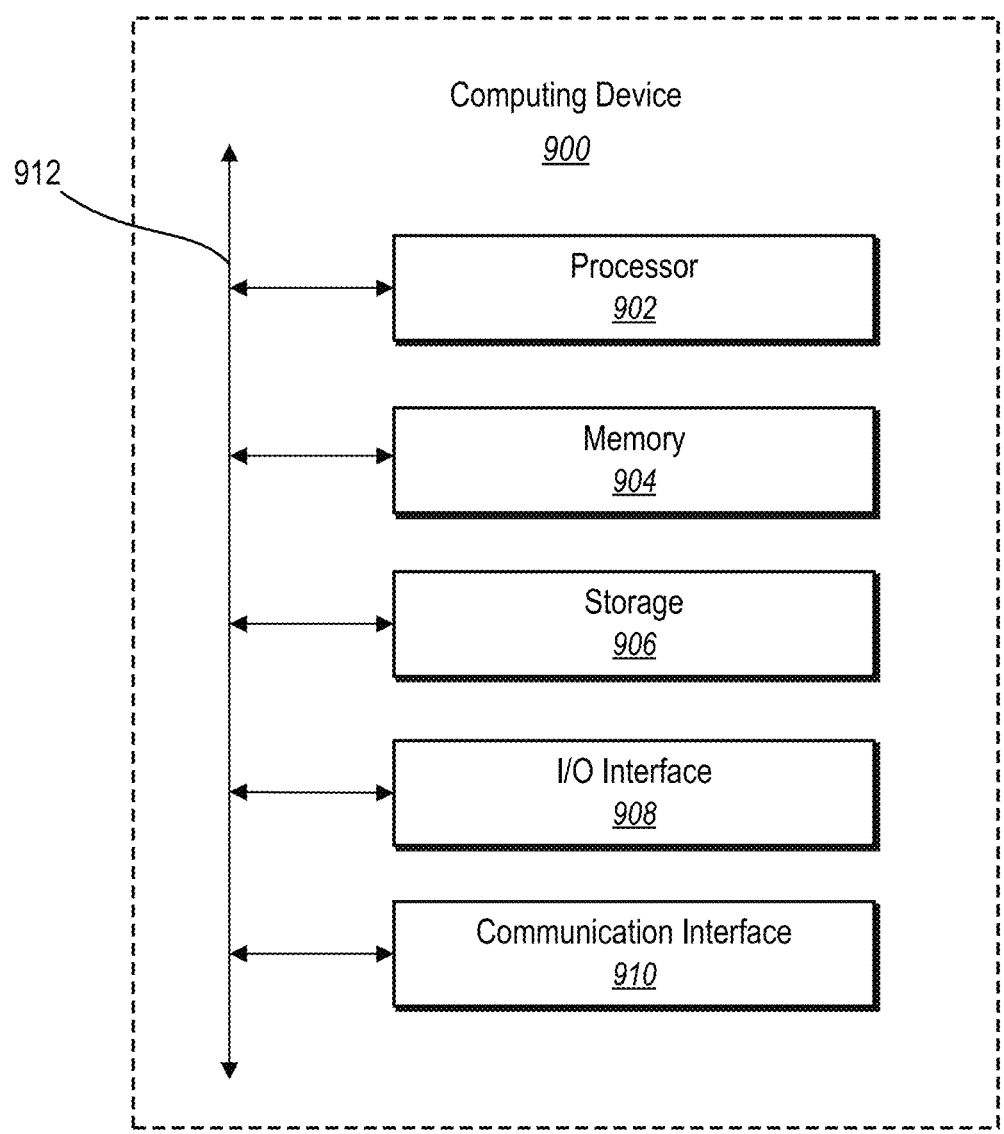
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102 and/or the client devices 110a-110n). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:
    identifying a plurality of nodes in a procedural material node graph of a procedural material; and
    generating a differentiable procedural material from the procedural material by replacing one or more nodes of the plurality of nodes in the procedural material node graph with differentiable nodes.

2. The non-transitory computer-readable medium of claim 1, further comprising mapping a node of the plurality of nodes to a differentiable node that is a differentiable approximation of an operation performed by the node.

3. The non-transitory computer-readable medium of claim 2, further comprising retrieving the differentiable node from a database storing a plurality of differentiable nodes, wherein the differentiable nodes are a subset of the plurality of differentiable nodes.

4. The non-transitory computer-readable medium of claim 1, further comprising instructions that, when executed by the at least one processor, cause the at least one processor to perform further operations comprising:
    generating a plurality of differentiable atomic nodes; and
    combining one or more differentiable atomic nodes from the plurality of differentiable atomic nodes to generate the differentiable nodes.

5. The non-transitory computer-readable medium of claim 4, wherein combining the one or more differentiable atomic nodes comprises merging inefficient calls of individual differentiable atomic nodes.

6. The non-transitory computer-readable medium of claim 1, further comprising instructions that, when executed by the at least one processor, cause the at least one processor to perform operations comprising converting a node into a differentiable node by:
    determining an output of a generator node; and
    utilizing the output within the differentiable procedural material.

7. The non-transitory computer-readable medium of claim 6, wherein utilizing the output within the differentiable procedural material comprises utilizing the output as an input for one or more differentiable nodes of the differentiable procedural material.

8. The non-transitory computer-readable medium of claim 6, wherein utilizing the output within the differentiable procedural material comprises utilizing a differentiable affine transformation filter node within the differentiable procedural material to incorporate a scale and offset parameters of the generator node.

9. The non-transitory computer-readable medium of claim 6, wherein converting the node into the differentiable node comprises utilizing a machine-learning library to translate the node into a differentiable program.

10. The non-transitory computer-readable medium of claim 6, wherein convert the node into the differentiable node comprises:
considering a continuous parameter as an optimizable and discrete parameter as non- optimizable parameter; and
defining a wrapper class to hold an optimizable parameter list and initial values for the continuous parameter.

11. A system comprising:
at least one memory device comprising a base procedural material; and
at least one processor coupled to the at least one memory device that causes the system to perform operations comprising:
identifying a plurality of nodes in a base procedural material node graph of a base procedural material;
generating a base differentiable procedural material from the base procedural material by replacing one or more nodes of the plurality of nodes in the base procedural material node graph with differentiable nodes;
receiving a digital image of a target physical material;
extracting a first set of deep neural features from the digital image of the target physical material;
extracting a second set of deep neural features from a digital image of the base procedural material;
modifying differentiable nodes of the base differentiable procedural material via back propagation based on comparing the first set of deep neural features and the second set of deep neural features; and
generating a target procedural material corresponding to the target physical material using the modified differentiable nodes.

12. The system of claim 11, wherein the at least one processor further causes the system to perform operations comprising determining procedural material parameters for the target physical material by:
iteratively generating an updated digital image of the base procedural material by modifying parameters of the differentiable nodes of the base procedural material;
comparing, with each iteration, the first set of deep neural features associated with the digital image of the target physical material and an updated set of deep neural features associated with the updated digital image of the base procedural material; and
updating, with each iteration, the modified parameters of the differentiable nodes of the base procedural material.

13. The system of claim 11, wherein:
the digital image of the target physical material comprises a first resolution; and
the at least one processor further causes the system to perform operations comprising utilizing the target procedural material to generate a second digital image of an object having the target physical material applied thereto, wherein the second digital image has a second resolution that is higher than the first resolution.

14. The system of claim 11, wherein the at least one processor further causes the system to perform operations comprising generating the base procedural material based on a reference procedural material node graph comprising a plurality of nodes by:
generating the differentiable nodes by generating differentiable approximations of operations performed by the plurality of nodes of the reference procedural material node graph; and
replacing the plurality of nodes of the reference procedural material node graph with the differentiable nodes.

15. The system of claim 11, wherein the at least one processor further causes the system to perform operations comprising generating, based on parameters of the base procedural material, the digital image of the base procedural material utilizing a differentiable rendering layer.

16. A computer-implemented method comprising: identifying a plurality of nodes of a procedural material by analyzing a procedural material node graph for the procedural material; mapping differentiable nodes from a database to nodes of the plurality of nodes; and generating a differentiable procedural material by replacing the nodes of the procedural material node graph for the procedural material with the differentiable nodes from the database.

17. The computer-implemented method of claim 16, further comprising converting the nodes of the plurality of nodes into the differentiable nodes by generating differentiable approximations of operations performed by the nodes.

18. The computer-implemented method of claim 17, further comprising converting the nodes of the plurality of nodes into the differentiable nodes by:
generating a plurality of differentiable atomic nodes; and
combining one or more differentiable atomic nodes from the plurality of differentiable atomic nodes to generate the differentiable nodes.

19. The computer-implemented method of claim 18, wherein generating the differentiable procedural material comprises:
determining an output of a generator node of the procedural material node graph for the procedural material; and
utilizing the output within the differentiable procedural material.

20. The computer-implemented method of claim 19, wherein utilizing the output within the differentiable procedural material comprises utilizing the output as an input for one or more differentiable nodes of the differentiable procedural material.

* * * * *